United States Patent
Christian et al.

(10) Patent No.: US 10,826,062 B2
(45) Date of Patent: Nov. 3, 2020

(54) PRIMARY ALKALINE BATTERY

(71) Applicant: DURACELL U.S. OPERATIONS, INC., Wilmington, DE (US)

(72) Inventors: Paul Albert Christian, Norton, MA (US); Yichun Wang, West Roxbury, MA (US); Nikolay Krastev Iltchev, Norfolk, MA (US); Kirakodu S. Nanjundaswamy, Potomac Falls, VA (US); Jennifer Anne Nelson, Waltham, MA (US); Fan Zhang, Newtown, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 26 days.

(21) Appl. No.: 16/357,245

(22) Filed: Mar. 18, 2019

(65) Prior Publication Data
US 2019/0214646 A1      Jul. 11, 2019

Related U.S. Application Data

(60) Continuation of application No. 15/136,847, filed on Apr. 22, 2016, now Pat. No. 10,232,520, which is a
(Continued)

(51) Int. Cl.
*H01M 4/525* (2010.01)
*H01M 4/50* (2010.01)
(Continued)

(52) U.S. Cl.
CPC ............ *H01M 4/505* (2013.01); *B26B 21/14* (2013.01); *B26B 21/222* (2013.01); *B26B 21/225* (2013.01); *B26B 21/4012* (2013.01); *B26B 21/521* (2013.01); *H01M 4/06* (2013.01); *H01M 4/08* (2013.01); *H01M 4/26* (2013.01); *H01M 4/366* (2013.01); *H01M 4/42* (2013.01); *H01M 4/50* (2013.01); *H01M 4/525* (2013.01);
(Continued)

(58) Field of Classification Search
None
See application file for complete search history.

(56) References Cited

U.S. PATENT DOCUMENTS

| 2,956,860 A | 10/1960 | Welsch et al. |
| 3,437,435 A | 4/1969 | Moore et al. |

(Continued)

FOREIGN PATENT DOCUMENTS

| CA | 1263697 A | 12/1989 |
| JP | 11-139830 | 5/1999 |

(Continued)

OTHER PUBLICATIONS

European Patent Application No. 19195828.9, Extended European Search Report, dated Jan. 3, 2020.
(Continued)

*Primary Examiner* — Basia A Ridley
*Assistant Examiner* — Heng M. Chan
(74) *Attorney, Agent, or Firm* — Marshall, Gerstein & Borun LLP

(57) ABSTRACT

A primary battery includes a cathode having a non-stoichiometric metal oxide including transition metals Ni, Mn, Co, or a combination of metal atoms, an alkali metal, and hydrogen; an anode; a separator between the cathode and the anode; and an alkaline electrolyte.

15 Claims, 16 Drawing Sheets

Related U.S. Application Data division of application No. 13/627,220, filed on Sep. 26, 2012, now Pat. No. 9,498,890, which is a division of application No. 12/722,669, filed on Mar. 12, 2010, now Pat. No. 8,298,706.

(51) Int. Cl.

| | | |
|---|---|---|
| *H01M 4/06* | (2006.01) | |
| *H01M 4/04* | (2006.01) | |
| *H01M 4/08* | (2006.01) | |
| *H01M 4/26* | (2006.01) | |
| *H01M 4/505* | (2010.01) | |
| *H01M 4/36* | (2006.01) | |
| *H01M 4/42* | (2006.01) | |
| *H01M 6/04* | (2006.01) | |
| *B26B 21/14* | (2006.01) | |
| *B26B 21/22* | (2006.01) | |
| *B26B 21/40* | (2006.01) | |
| *B26B 21/52* | (2006.01) | |

(52) U.S. Cl.
CPC .......... *H01M 6/04* (2013.01); *H01M 2220/30* (2013.01); *Y10T 29/49108* (2015.01); *Y10T 29/49115* (2015.01)

(56) References Cited

U.S. PATENT DOCUMENTS

| | | |
|---|---|---|
| 3,520,729 A | 7/1970 | Voss et al. |
| 4,136,236 A | 1/1979 | Ruetschi |
| 4,192,914 A | 3/1980 | Ruetschi |
| 4,246,253 A | 1/1981 | Hunter |
| 4,312,930 A | 1/1982 | Hunter |
| 4,383,029 A | 5/1983 | Yamada et al. |
| 4,451,543 A | 5/1984 | Dzieciuch et al. |
| 4,777,100 A | 10/1988 | Chalilpoyil et al. |
| 4,959,282 A | 9/1990 | Dahn et al. |
| 5,264,201 A | 11/1993 | Dahn |
| 5,277,890 A | 1/1994 | Wang et al. |
| 5,348,726 A | 9/1994 | Wang et al. |
| 5,391,365 A | 2/1995 | Wang et al. |
| 5,425,932 A | 6/1995 | Tarascon |
| 5,482,796 A | 1/1996 | Wang et al. |
| 5,532,084 A | 7/1996 | Wang et al. |
| 5,587,133 A | 12/1996 | Amatucci et al. |
| 5,720,932 A | 2/1998 | Amine et al. |
| 5,759,510 A | 6/1998 | Pillai |
| 5,772,890 A | 6/1998 | Hubred |
| 5,783,334 A | 7/1998 | Yasuda |
| 5,798,180 A | 8/1998 | Chowdhury et al. |
| 5,910,366 A | 6/1999 | Chowdhury et al. |
| 5,952,124 A | 9/1999 | Kainthla et al. |
| 5,955,052 A | 9/1999 | Padhi et al. |
| 6,074,784 A | 6/2000 | Maruta |
| 6,162,561 A | 12/2000 | Wang et al. |
| 6,270,921 B1 | 8/2001 | Kaplan et al. |
| 6,284,410 B1 | 9/2001 | Durkot et al. |
| 6,334,993 B1 | 1/2002 | Suita et al. |
| 6,335,119 B1 | 1/2002 | Maruta |
| 6,428,766 B1 | 8/2002 | Fujino et al. |
| 6,472,103 B1 | 10/2002 | Durkot et al. |
| 6,492,062 B1 | 12/2002 | Wang et al. |
| 6,509,117 B1 | 1/2003 | Bowden et al. |
| 6,521,378 B2 | 2/2003 | Durkot et al. |
| 6,566,009 B1 | 5/2003 | Noya et al. |
| 6,589,693 B1 | 7/2003 | Kilby et al. |
| 6,617,072 B2 | 9/2003 | Venkatesan et al. |
| 6,620,550 B2 | 9/2003 | Christian et al. |
| 6,667,131 B1 | 12/2003 | Vitins et al. |
| 6,753,109 B2 | 6/2004 | Nanjundaswamy et al. |
| 6,759,166 B2 | 7/2004 | Wang et al. |
| 6,783,893 B2 | 8/2004 | Bowden et al. |
| 6,794,082 B2 | 9/2004 | Mori et al. |
| 6,818,347 B1 | 11/2004 | Jin et al. |
| 6,858,349 B1 | 2/2005 | Luo et al. |
| 6,932,846 B2 | 8/2005 | Bowden et al. |
| 6,991,875 B2 | 1/2006 | Christian et al. |
| 7,045,247 B1 | 5/2006 | Copeland et al. |
| 7,045,252 B2 | 5/2006 | Christian et al. |
| 7,081,319 B2 | 7/2006 | Christian et al. |
| 7,273,680 B2 | 9/2007 | Durkot et al. |
| 7,407,521 B2 | 8/2008 | Shimakawa et al. |
| 7,407,726 B2 | 8/2008 | Wang et al. |
| 7,435,395 B2 | 10/2008 | Durkot et al. |
| 7,569,306 B2 | 8/2009 | Kato et al. |
| 2002/0172867 A1 | 11/2002 | Anglin |
| 2004/0009400 A1 | 1/2004 | Yamaguchi et al. |
| 2004/0058242 A1 | 3/2004 | Christian et al. |
| 2004/0175616 A1 | 9/2004 | Bowden et al. |
| 2005/0079424 A1 | 4/2005 | Davis et al. |
| 2005/0152830 A1 | 7/2005 | Yasutomi et al. |
| 2005/0221181 A1 | 10/2005 | Durkot et al. |
| 2005/0250012 A1 | 11/2005 | Bofinger et al. |
| 2006/0275667 A1 | 12/2006 | Watanabe et al. |
| 2007/0015054 A1 | 1/2007 | Nunome et al. |
| 2007/0248879 A1 | 10/2007 | Durkot et al. |
| 2008/0008937 A1 | 1/2008 | Eylem et al. |
| 2008/0171266 A1 | 7/2008 | Kato et al. |
| 2008/0193487 A1 | 8/2008 | Schild et al. |
| 2008/0193847 A1 | 8/2008 | Suetsugu et al. |
| 2008/0241683 A1 | 10/2008 | Fensore et al. |
| 2009/0047578 A1 | 2/2009 | Iwamoto et al. |
| 2009/0249614 A1 | 10/2009 | Davis et al. |
| 2009/0258297 A1 | 10/2009 | Davis et al. |
| 2010/0003596 A1 | 1/2010 | Sato et al. |
| 2011/0151329 A1 | 6/2011 | Bernard et al. |
| 2011/0219607 A1 | 9/2011 | Nanjundaswamy et al. |
| 2011/0220842 A1 | 9/2011 | Nanjundaswamy et al. |
| 2011/0223477 A1 | 9/2011 | Nelson et al. |

FOREIGN PATENT DOCUMENTS

| | | |
|---|---|---|
| JP | 11139831 | 5/1999 |
| JP | 3680306 B2 | 8/2005 |
| JP | 2007026896 A | 2/2007 |
| WO | WO-2009/082862 A1 | 7/2009 |

OTHER PUBLICATIONS

Abbas et al., "Hydroxyl as a defect of the manganese dioxide lattice and its applications to the dry cell battery", Journal of Power Sources, vol. 58:15-21 (1996).

Alcantara et al., "Chemically deintercalated cathode materials for lithium cells", Ionics, vol. 1(3):246-250 (1995) (Abstract only).

Alcantara et al., "Structure and electrochemical properties of $Li_{1-x}(Ni_yCo_{1-y})_{1+x}O_2$", J. Electrochem. Soc. vol. 142(12):3997-4005 (1995).

Ammundsen et al., "Effect of Chemical Extraction of Lithium on the Local Structure of Spinel Lithium Manganese Oxides Determined by X-ray Absorption Spectroscopy", Chemistry of Materials, vol. 7:2151-60 (1995).

Ammundsen, D.J., "Mechanism of Proton Insertion and Characterization of the ProtonSites in Lithium Manganate Spinets", Jones & J. Roziere, Chem. Mater., vol. 8:2799-2808 (1996).

Arai et al., "Characteristics of LixNiO2 obtained by chemical delithiation", Journal of Power Sources, vols. 81-82:401-405 (1999).

Arai et al., "Nickel dioxide polymorphs as lithium insertion electrodes", Electrochimica Acta vol. 47:2697-2705 (2002).

Arai et al., "Structural and thermal characteristics of nickel dioxide derived from LiNiO2", Journal of Solid State Chemistry, vol. 163:340-349 (2002).

Arai et al., "Synthesis and electrode perfoimance of layered nickel dioxide containing alkaline ions", Electrochimica Acta vol. 50:1821-1828 (2005).

Ariza et al., "Probing the local structure and the role of protons in lithium sorption processes of a new lithium-rich manganese oxide", Chem. Mater. vol. 18:1885-1890 (2006).

(56) References Cited

OTHER PUBLICATIONS

Armstrong, Demonstrating oxygen loss and associated structural reorganization in the lithium battery cathode $Li[Ni_{0.2}Li_{0.2}Mn_{0.6}]O_2$, JACS vol. 128:8694-98(2006).

Arunkumar et al., "Chemical an destructural instability of the chemically delithiated $(1-z)Li[Li_{1/3}Mn_{frax;2;3}]O_2(z)Li[Co_{1-y}Ni_y]O_2$ ($0 \leq y \leq 1$ and $0 \leq z \leq 1$) solid solution cathodes", J. Mater. Chem. vol. 18:190-198 (2008).

Axmann et al., Formation of $FE^{IV}$ and $Ni^{IV}$ by electrochemical and chemical oxidation of an iron-substituted nickel(II) hydroxide: the direct two-electronic step NiII →NiIV +2e-, Angen. Chem. Int. Ed. Eng. vol. 35(10):1115 (1996).

Axmann et al., "Nickel hydroxide as a matrix for unusual valencies: the electrochemical behavior of metal(III)-ion-substituted nickel hydroxides of the pyroaurite type", J. Alloys and Cpds. vol. 246(1-2):232-241 (1997)(abstract only).

Benhaddad et al., "Reactivity of Nanostructured $MnO_2$ in Alkaline Medium Studied with a Micro-Cavity Electrode: Effect of Synthesizing Temperature", Applied Materials and Interfaces, vol. 1(2):424-432 (2009).

Blesa et al., "A new route to γ-Fe2O3 via an intermediate oxyhydroxide. The reaction of a-$NaFeO_2$ with benzoic acid", J Mat Chem, 9(1), 1999, pp. 227-231.

Blesa et al., "Nonstoichiometric spinel ferrites obtained from α-$NaFeO_2$ via molten media reactions", Inorganic Chem. vol. 41(23):5961-5967 (2002)(Abstract only).

Blesa et al., "α-$NaFeO_2$: ionic conductivity and sodium extraction", Solid State Ionics,vol. 126:81-87 (1999).

Bolibar et al., "Synthesis, characterization and thermal decomposition study of some nickel nitro derivatives", J. Mater, Chem. vol. 7(11):2259-2264 (1997).

Cheng et al., "Facile controlled synthesis of $MnO2$ nanostructures of novel shapes and their application in batteries", Inorganic Chemistry, vol. 45(5):2038-2044 (2006).

Chitrakar et al., "A new type of manganese oxide ($MnO2 \cdot 5H2O$) derived from $Li1.6Mn1.6O4$ and its lithium ion-sieve properties", Chem. Mater. vol. 12(10):3151-3157 (2000).

Choi et al., "Proton insertion into oxide cathodes during chemical delithiation", Electrochemical and Solid State Letters. vol. 9(5):A241-244 (2006).

Croguennec et al., "Structural characterisation of the highly deintercalated $LixNi1.0O2$ phases (with x ? 0.30)" J. Mater. Chem., 11, pp. 131-141, 2001.

Crompton, Battery Reference Book. "Guidelines to battery selection", 3rd ed., Oxford: Reed Educational and Professional Publishing, Ltd. Chapter 2 (2000).

Dahn et al., "Structure and electrochemistry of $Li1 \pm yNiO2$ and a new $Li2NiO2$ phase with the $Ni(OH)2$ structure", Solid State Ionics, vol. 44(1-2):87-97 (1990).

Dai et al., "Preparation and Characterization of Nanostructured $MnO_2$ for Lithium Batteries", Proc. 40th Power Sources Conf., pp. 283-286 (2002).

David et al. Structure Refinement of the Spinel-Related Phases $Li2Mn2O4$ and $Li0.2Mn2O4$, Journal of Solid State Chemistry, vol. 67(2):316-323 (1987).

Delmas, "On the behavior of the $Li_xNiO_2$ system: an electrochemical and structural overview", J. Power Sources vol. 68:120-25 (1997).

Dominko et al., "A novel coating technology for preparation of cathodes in Li-ion batteries", Electrochemical and Solid State Letters, vol. 4(11):A187-A190 (2001).

Dutta et al., "Chemical synthesis and properties of $Li1-?-x,Ni1+?O2$ and $Li[Ni2]O4$", J.Solid State Chemistry, vol. 96:123-131 (1992).

Ebner et al., "The $LiNiO_2$/carbon lithium-ion battery", Solid State Ionics, 69, pp. 238-256 (1994).

Endres et al., "Extraction of lithium from spinel phases of the system $Li_{1-x}Mn_{2-x}O4$-", J. Power Sources, vol. 69:145-156 (1997).

Fang et al., "Low-temperature synthesis of highly crystallized $LiMn_2O_4$ from alpha manganese dioxide nanorods", Journal of Power Sources, vol. 184:494-7 (2008).

Feng et al., "Alkali metal ions insertion/extraction reactions with hollandite-type manganese oxide in the aqueous phase", Chem. Mater. vol. 7:148-153 (1995).

Feng et al., "Synthesis of hollandite-type manganese dioxide with $H^+$ form for lithium rechargeable battery", J. Electrochem. Soc., vol. 141(10):L135 (1994).

Feng et al., "$Li(1^+)$ Extraction/Insertion with Spinel-Type Lithium Manganese Oxides. Characterization of Redox-Type and Ion-Exchange-Type Sites", Langmuir vol. 8:1861-1867 (1992).

Fong et al., "A powder neutron diffraction study of λ and γ manganese dioxide and of $LiMn_2O_4$", Zeitschrift fur Kristallographie, vol. 209:941-945 (1994).

Franger et al., "Development of new low temperature manganese oxides as lithium insertion compounds", Recent Research Developments in Solid State Ionics, vol. 3:1-22 (2006)(abstract only).

Gao, "Synthesis and Characterization of $Li_{1-x}Mn_{2-x}O_4$ for Li-Ion Battery Applications", Journal of the Electrochemical Society, vol. 143(1):100-114 (1996).

Gummow et al., "Improved capacity retention in rechargeable 4 V lithium/lithium-manganese oxide (spinel) cells", Solid State Ionics, vol. 69:59-67 (1994).

Hill et al., "Electrochemical Synthesis of Beta- and Gamma-Manganese Dioxides under Hydrothermal Conditions", Electrochemical and Solid State Letters, vol.(6):D1-3(2001).

Hunter et al., "Nonaqueous electrochemistry of LAMBDA-MnO2", Proc. Electrochem.Soc., vol. 85(4):444-51 (1985).

Hunter et al., "Preparation of a New Crystal Form of Manganese Dioxide: λ-MnO2",Journal of Solid State Chemistry, vol. 39:142-147 (1981).

Ji et al., "Simple fabrication of nano-sized $NiO_2$ powder and its application to oxidation reactions", Applied Catalysis A: general, vol. 282(1-2):25-30 (2005)(Abstract only).

Kanoh et al., In situ raman spectroscopic study on electroinsertion of Li+ into a Pt/λ-MnO2 electrode in aqueous solution, Electrochem. and Solid State Letters,vol. 1(1):17-19 (1998).

Kanoh et al., "Selective electroinsertion of lithium ions into a Pt/λ-MnO2 electrode in the aqueous phase", Langmuir vol. 7:1841-2 (1991).

Kanzaki et al., "Mechanism of Lithium Ion Insertion into λ-MnO2", J. Electrochem. Soc., vol. 138(1):333-4 (1991).

Kao et al., "Phase transformation of gamma-EMD to beta manganese dioxide during digestion in sulfuric acid", J. Electrochem. Soc. vol. 134:1321-1252 (2008).

Kijima et al., "Preparation and Characterization of Open Tunnel Oxide α-MnO2 Precipitated by Ozone Oxidation", Journal of Solid State Chemistry, vol. 159:94-102(2001).

Kim et al., "Direct carbon-black coating on $LiCoO_2$ cathode using surfactant for high-density Li-ion cell", Journal of Power Sources vol. 139:289-294 (2005).

Komaba et al., "Preparation and electrochemical alpha manganese dioxide and Li—Mn—O spinel", 2305 (2005).

Komaba et al., "Synthesis of layered $MnO_2$ by calcination of $KMnO_4$ for rechargeable lithium battery cathode", Electrochimica Acta, vol. 46:31-35 (2000).

Kosova et al., "Comparative study of $LiCoO_2$ surface modified with different oxides", Journal of Power Sources, vol. 174, No. 2, pp. 959-964, Dec. 6, 2007.

Kozawa, "Formation of Manganate and Permanganate Ions from Manganese Dioxide in Aqueous Solution", J. Electrochem. Soc. (1976) Japan (Denki Kagaku), vol. 44(8):508-13 (1976).

Lander et al., "Barium-nickel oxides with tri-and tetravalent nickel", Contribution from the Bell Telephone Laboratories, vol. 73:2452-2454 (1951).

Larcher et al., "Synthesis of $MnO_2$ Phases from $LiMn2O4$ in Aqueous Acidic Media", Journal of the Electrochemical Society, vol. 145(10):3393-3400 (1998).

Lavela et al., "Chemical delithiation, thermal transformations and electrochemical behaviour of iron-substituted lithium nickelate", Materials Research Society Symposium Proceedings pp. 658 (2001)(Abstract only).

(56) References Cited

OTHER PUBLICATIONS

Lavela et al., "Effects of partial acid delithiation on the electrochemical lithium insertion properties of nickel-stabilized $LiMn_2O_4$ spinel oxides", J. of Solid State Chemistry, vol. 150:196-203 (2000).
Lee et al., "Identification of a new strontium Ni(III) oxide prepared in molten hydroxides", J. Solid State Chem. vol. 93:267-71 (1991).
Linden and T. B. Rebby, Handbook of Batteries, New York: McGraw-Hill Co., Inc. (1995) "1.4 Classification of Cells and Batteries," pp. 1.9-1.11; "7.1 General Characteristics and Applications of Primary Batteries," pp. 7.3-7.7; "$11/13$ Lithium/Bismuth Oxide Cells," pp. 11-79 to 11-81; Chapter 12, "Silver Oxide Cells," pp. 12.1-12.16; "23.1 General Characteristics and Applications of Secondary Batteries," pp. 23.3-23.12.
Liu et al., "Preparation and alkali-metal ion extraction/insertion reactions with nanofibrous manganese oxide having 2+4 tunnel structure", Chem. Mater., vol. 15:3696-3703 (2003).
Lu et al., "Characterization of structure and electrochemical properties of lithium manganese oxides for lithium secondary batteries hydrothermally synthesized from $\delta$-KxMnO2", Electrochimica Acta, vol. 49:2361-2367 (2004).
Lubin et al., "Chemical lithium extraction from manganese oxides for lithium rechargeable batteries", J. Power Sources vol. 34:161-173 (1991).
Maruta et al., "Low-temperature synthesis of lithium nickelate positive active material from nickel hydroxide for lithium cells", Journal of Power Sources, vol. 90:89-94 (2000).
Morales et al., "Acid-delithiated $Li1-x(NiyCo1-y)1+xO2$ as insertion electrodes in lithium batteries, J. Solid State Chemistry, vol. 113(1):182-92 (1994)(abstract only).
Morales et al., "Cation distribution and chemical deintercalation of $Li1-xNi1+xO_2$", Materials Research Bulletin, vol. 25(5):623-630 (1990).
Morales et al., Thermal behavior of chemically deintercalated ($Li_{1-x}Ni_{1+x}O_2$), J. Thermal Analysis, vol. 38(3):295-301 (1992)(abstract only).
Mosbah et al., "Phases $Li_xMnO_2\lambda$ rattachees au type spinelle", Materials Research bulletin, vol. 18:1375-1381 (1983).
Motohashi et al., "Synthesis and properties of $CoO_2$, the x=0 End member of the LixCoO2 and NaxCoO2 systems", Chem. Mater. vol. 195:063-5066 (2007).
Nishimura et al., Shizen Sozai Gakkai-shi, vol. 107(11):805-10 (1991).
Ohzuku et al., "Electrochemistry of Manganese Dioxide in Lithium Non Aqueous Cell", Journal of the Electrochemical Society, vol. 137(3):769-775 (1990).
Ohzuku et al.,, "Electrochemistry and Structural Chemistry of $LiNiO2$ ($R_{3m}$) for 4 Volt Secondary Lithium Cells", J. Electrochem. Soc., vol. 140(7):1862-1870 (1993).
Ooi et al., "Lithium-ion insertion/extraction reaction with $\lambda$-$MnO_2$ in the aqueous phase", Chemistry Letters, pp. 989-992 (1998).
Ooi et al., "Mechanism of Li+ insertion in spinel-type manganese oxide—redox and ion-exchange reactions", Langmuir vol. 7:1167-71 (1992).
Palacin et al., "Low-temperature synthesis of $LiNiO_2$ Reaction Mechanism, Stability, and Electrochemical Properties", J. Electrochem. Soc. vol. 144(12):4226-4236 (1997).
Patrice et al., "Understanding the second electron discharge plateau in $MnO_2$-based alkaline cells", J. Electrochem, vol. 148(5):A448-A455 (2001).
Puckhaber et al., "Laser Diffraction+Millennium-Link for Particle Size Analysis", Powder Handling & Processing, vol. 11(1):91-5 (1999).
Read et al., "Low Temperature Performance of $\lambda$ $MnO_2$ in Lithium Primary Batteries", Electrochemical and Solid-State Letters, vol. 4(10):A162-A165 (2001).
Rossouw et al., "Alpha manganese dioxide for lithium batteries: A structural and electrochemical study", Mat. Res. Bull. vol. 27(2):221-230 (1992).
Schilling et al., "Thermodynamic Stability of Chemically Delithiated $Li(Li_xMn_{2-x})O_4$", Journal of the Electrochemical Society, vol. 145(2):569-575 (1998).
Schilling et al., "Modification of the high rate discharge behavior of Zn—MnO2 alkaline cells through the addition of metal oxides to the cathode", ITE Letters on Batteries, vol. 2(3):B24-31 (2001).
Shen et al., "Phase Transitions and Ion Exchange Behavior of Electrolytically Prepared Manganese Dioxide", J. Solid State Chem., vol. 64:270-282 (1986).
Stoyanova et al., "Effect of Mn-substitution for Co on the crystal structure and acid delithiation of $LiMn_yCo_{1-y}O_2$ solid solutions", Solid States Ionics, vol. 73(3-4):233-240 (1994).
Stoyanova et al., "New data on chemical delithiation of $Li_xNi_{2-x}O_2$ ($0.6 < x < 1$)", J. Solid State Chemistry, vol. 108(2):211-218 (1994).
Sun et al., "Low temperature synthesis of layered $LiNiO_2$ cathode material in air atmosphere by ion exchange reaction", Solid State Ionics, vol. 177(13-14):1173-1177 (2006).
Takeda et al., Crystal chemistry and physical properties of $La_{2-x}Sr_xNiO_4(0 \leq x \leq 1.6)$, Mat. Res. Bull. vol. 25(3):293-306 (1990).
Tang et al., "Lithium ion extraction from orthorhombic $LiMnO_2$ in ammonium peroxodisulfate solutions", Journal of Solid-State Chemistry, vol. 142(1):19-28 (1999).
Tang et al., "Preparation of plate-form manganese oxide by selective lithium extraction from monoclinic $Li_2MnO_3$ under hydrothermal conditions", Chem. Mater. vol. 12(11):3271-3279 (2000).
Thackarey, "Manganese oxides for lithium batteries", Progress in Solid State Chemistry, vol. 25(1-2):1-71 (1997).
Venkatraman et al., "Factors influencing the chemical lithium extraction rate from layered LiNi1-y-zCoyMnO2 cathodes", Electrochemistry Communications, vol. 6(8):832-837 (2004).
Walanda et al., "Hydrothermal $MnO_2$: synthesis, structure, morphology and discharge performance", Journal of Power Sources vol. 139(1-2):325-341 (2005).
Wang et al., "Selected-Control Hydrothermal Synthesis of $\alpha$- and $\beta$-MnO2 Single Crystal Nanowires", Journal of the American Chemical Society, vol. 12(12):2280-2881(2002).
Wang et al., "A novel chemically synthesized manganese dioxide—its preparation and structural characterization", Progress in Batteries and Battery Materials, vol. 17:222-231 (1998).
Xia et al., "Study on the electrochemical performance of $\lambda$-$MnO_2$ in alkaline solution", Dianyuan Jishu, vol. 23(Suppl.):74-76 (1999)(abstract only).
Yang et al., "Synthesis of $Li_{1.33}Mn_{1.67}O_4$ spinels different morphologies and their ion adsorptivities after delithiation", J. Mater. Chem. vol. 10:1903-1909 (2000).
Yin et al., X-ray/neutron diffraction and electrochemical studies of chemical lithium De/Re-Intercalation in $Li1-xCo⅓Ni⅓Mn⅓O2$ ($x=0 \rightarrow$ ), Chem. Mater. vol. 18(7):1901-1910 (2006).
Zhecheva et al., "New phases obtained by acid delithiation of layered $LiMO_2$(M=Co,Ni)", Material Science Forum vols. 152-153:259-262 (1994).
Zliecheva et al., $Li_{1-x-y}H_yCo_xO_2$, J. Solid State Chemistry, vol. 109(1):47-52 (1994)(Abstract only).

PRIMARY ALKALINE BATTERY

CROSS-REFERENCE TO RELATED APPLICATION

This application is a continuation of U.S. patent application Ser. No. 15/136,847, filed Apr. 22, 2016, which is a divisional of U.S. patent application Ser. No. 13/627,220, filed Sep. 26, 2012 (now U.S. Pat. No. 9,498,890, issued Nov. 22, 2016), which is a divisional of U.S. patent application Ser. No. 12/722,669, filed on Mar. 12, 2010, (now U.S. Pat. No. 8,298,706, issued Oct. 30, 2012), all of which are expressly incorporated herein by reference and made a part hereof.

FIELD OF THE INVENTION

The invention relates to primary alkaline batteries.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to cathode active, materials, and to methods of making cathode active materials for alkaline batteries. The cathode active materials can include a non-stoichiometric alkali metal oxide. The non-stoichiometric alkali metal oxide can be synthesized by acid treatment of a stoichiometric alkali metal oxide to remove alkali metal and to increase the oxidation state of the metal (e.g., a transition metal). The non-stoichiometric metal oxides can provide a battery with a high volumetric energy density. The non-stoichiometric metal oxide can have to solubility (e.g., less than 300 ppm, less than 100 ppm, or less than 50 ppm) depending on the transition metal in the cathode active material. As a result, battery 10 can have good ambient shelf life. Further, a higher oxidation state can increase the capacity of the battery. The acid treatment can occur at low temperature to minimize side reactions and undesirable side products. Without wishing to be bound by theory, it is believed that an aqueous acid can provide protons which can partially displace alkali metal ions within the metal oxide crystal structure and help maintain the stability of the crystal structure.

In one aspect, the invention features a method of making a battery including treating an oxide including at least one transition metal and an alkali metal with an aqueous acid solution, including contacting the oxide with the aqueous acid solution (e.g., to remove alkali metal from the oxide and to increase the oxidation state of the transition metal). The treated oxide is incorporated into a cathode, which can be incorporated into a battery.

In another aspect, the invention features a battery (e.g., a primary battery) including a cathode including an oxide of formula $A_{1-x}H_yM^a{}_{1-z-t}M^b{}_zM^c{}_tO_2$, an anode, a separator between the cathode and the anode, and an alkaline electrolyte. In, formula $A_{1-x}H_yM^a{}_{1-z-t}M^b{}_zM^c{}_tO_2$, A is an alkali metal, $M^a$ and $M^b$ are transition metals, $M^c$ is a dopant that can substitute for $M^a$, y is less than or equal to x, and z+t is between 0 and 1. $M^c$ can be a transition metal, a non-transition metal or a non-metal.

In another aspect, the invention features a cathode including a composite of $Li_{1-x}H_yNiO_2$ and one or more cathode active materials selected from the group consisting of acid-treated electrolytic manganese dioxide, acid-treated chemically-prepared manganese dioxide, λ-$MnO_2$, layered cobalt oxide, and/or layered manganese oxide.

In another aspect, the invention features a method of making a cathode including forming a mixture of a layered lithium nickel oxide and precursors to one or more cathode active material materials selected from the group consisting of electrolytic manganese dioxide, chemically-prepared manganese oxide, spinel-type lithium manganese oxide, layered lithium cobalt oxide, and/or layered lithium manganese oxide; and treating, the mixture with an aqueous acid solution at low temperature to form a composite of $Li_{1-x}H_yNiO_2$ and one or more cathode active materials.

In another aspect, the invention features a method of making a battery, including incorporating a cathode including a composite prepared by acid treatment of a mixture of $LiNiO_2$ and one or more precursors to one or more cathode active materials into a battery. The one or more precursors to one or more cathode active materials can include electrolytic manganese dioxide, chemically-prepared manganese dioxide, spinel-type lithium manganese oxide, layered lithium cobalt oxide, and/or layered lithium manganese oxide.

Embodiments of the battery may include one or more of the following features. The oxide can include $LiNiO_2$, $LiCoO_2$, $LiNi_{1-z}Co_zO_2$, $LiMn_2O_4$, $Li_2Mn_4O_9$, $LiNi_{1-z-t}Co_zAl_tO_2$ and $Li_4Mn_5O_{12}$. The oxide can be treated with the aqueous acid solution for a period of 2 to 72 hours (e.g., 2 to 48 hours, or 12 to 24 hours). The aqueous acid solution can include aqueous sulfuric acid and/or aqueous nitric acid. The concentration of the aqueous acid solution can, be between 1 M and 10 M. The oxide can be treated with an aqueous acid solution at about zero degree Celsius to about five degrees Celsius. After contacting the oxide with the aqueous acid solution, treating the oxide can further include washing the oxide with water, and drying the oxide. In some embodiments, treating the oxide can include repeating the steps of contacting the oxide with the aqueous acid, washing the oxide with water, and drying the oxide.

The treated oxide can have a residual alkali content of from about 10 percent to about 90 percent of the alkali metal content in the untreated oxide (e.g., about 20 percent to about 70 percent, about 30 percent to about 50 percent) of the alkali metal content in the untreated oxide. The average oxidation, state of a transition metal in the treated oxide can be at least about 0.1 greater (e.g., at least about 0.3 greater, at least about 0.5 greater) than the average oxidation state of the transition metal in the untreated oxide. The treated oxide can further include protons. The proton content in the treated oxide can be from about 5 percent (e.g., from about 10 percent, from about 30 percent, from about 50 percent) to 90 percent (e.g., to 80 percent, to 70 percent) more than the proton content in the untreated oxide. The treated oxide can have a non-spherical morphology, such as a block, a flake, a rod or a plate.

The layered cobalt oxide can be a partially delithiated layered lithium cobalt oxide. The layered manganese oxide can be a partially delithiated layered lithium manganese oxide. The λ-$MnO_2$ can be a partially delithiated spinel-type lithium manganese oxide. The composite can include a $Li_{1-x}H_yNiO_2$ to acid-treated electrolytic manganese oxide weight ratio of 19:1 or less, or 1:9 or more. In some embodiments, the layered lithium nickel oxide is $LiNiO_2$ and/or $LiNi_{1-z}Co_zO_2$.

The battery can include an anode including, zinc (e.g., fine zinc), zinc alloy, and/or zinc alloy particles. The battery can further include an alkaline electrolyte solution, and a separator. The cathode can further include between 2 wt % and 35 wt % between 5 wt % and 20 wt %, between 3 wt % and 8 wt %, between 10 wt % and 15 wt %) conductive additive. The conductive additive can include graphite, carbon black, acetylene black, partially graphitized carbon black, silver powder, gold powder, nickel powder, carbon fibers, carbon, nanofibers, carbon nanotubes, and graphene. The graphite can be selected from the group consisting of non-synthetic or natural non-expanded graphite, synthetic non-expanded graphite, non-synthetic or natural expanded graphite, synthetic expanded graphite, and oxidation-resistant, non-expanded synthetic graphite.

In some embodiments, the cathode can further include a second cathode active material, such as electrolytic manganese dioxide, chemically-prepared manganese dioxide, acid-treated electrolytic manganese dioxide, and/or acid-treated chemically-prepared manganese dioxide. The transition metal can include Ni, Co, Mn, Fe, and/or combinations thereof. The alkali metal can include Li, Na, K, Cs, Rb, and/or combinations thereof. The dopant can include Mg, Ca, Ba, Al, Cr, Y, Zr, Nb, Hf, Ti, and combinations thereof. For an oxide having a formula of $A_{1-x}H_yM^a_{1-z-t}M^b_zM^c_tO_2$, the oxide can be selected from the group consisting of $Li_{1-x}H_yNiO_2$, $Li_{1-x}H_yCoO_2$, $Li_{1-x}H_yNi_{1-z-t}Co_zAl_tO_2$, and $Li_{1-x}H_yNi_{1-z}Co_zO_2$, where x is from about 0.1 to about 0.9, y is from about 0.1 to about 0.9, z is from about 0.05 to about 0.95, t is from about 0.05 to 0.95, and the values of x, y, z, and t can each vary independently. The Ni and/or Co can have an oxidation state of greater than +3. The oxide is a solid solution, and can have a non-spherical or a layered morphology. The oxide can be a solid solution and can have a layered, spinel, or intergrowth crystal structure.

The electrolyte can include lithium hydroxide, sodium hydroxide, and/or potassium hydroxide. The separator can be capable of preventing soluble oxide species from diffusing from the cathode to the anode. The separator can be capable of trapping soluble oxide species.

The oxide can include an electrically conductive portion. The electrically conductive portion can be an electrically conductive surface coating, which can include carbon or a metal oxide, for example, graphite, carbon black, acetylene black, manganese dioxide, cobalt oxide, cobalt oxyhydroxide, silver oxide, silver nickel oxide, nickel oxyhydroxide, and/or indium oxide.

The details of one or more embodiments of the invention are set forth in the accompanying drawings and the description below. Other features and advantages will be apparent from the detailed description, the drawings, and from the claims.

DETAILED DESCRIPTION

Figure 1:
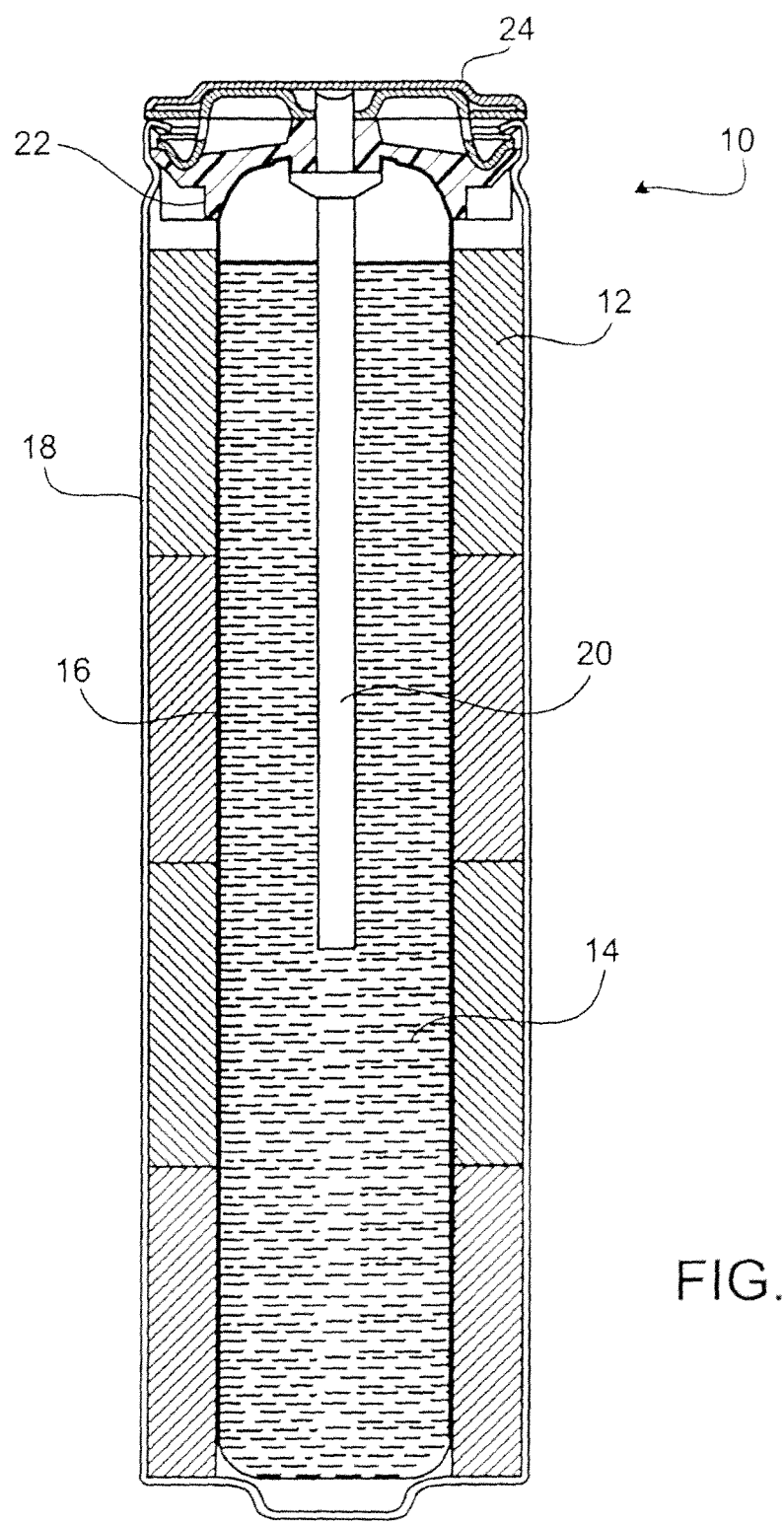
FIG. 1 is a schematic side-sectional view of an alkaline primary round cell/battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with, housing 18, and the positive terminal of battery 10 is at the opposite end of battery 10 from the negative terminal. An electrolyte solution, e.g., an alkaline solution, is dispersed throughout battery 10.

Cathode 12 includes an electrochemically active material having a non-stoichiometric metal oxide including an alkali, metal and a proton, an electrically conductive additive, and optionally a binder.

The metal oxide can be a non-stoichiometric alkali metal-containing transition metal oxide ("non-stoichiometric metal oxide"). As used herein, a non-stoichiometric metal oxide refers to compounds having a generic formula $A_{1-x}M_{1+x}O_2$, where the compound can contain "A" an alkali metal ion, "M" a metal ion (e.g., a transition metal ion) having multivalent oxidation states (e.g 3+/2+) wherein "M" can also partially occupy "A" alkali metal sites in the crystal lattice. For example, the non-stoichiometric metal oxide can include $Li_{1-x}Ni_{1+x}O_2$, where $Ni^{2+}$ can partially occupy Li sites in the crystal lattice. The nonstoichiometric metal oxide can have a deficiency of alkali metals compared to a fully stoichiometric compound having a generic formula of $AMO_2$. A non-stoichiometric metal oxide can contain defects in the crystal lattice, for example, in the case where the alkali metal has been deintercalated or leached out of the crystal lattice. In some embodiments, the non-stoichiometric metal oxide can have a general formula of $A_{1-x}H_yM^a_{1-z-t}M^b_zM^c_tO_2$, where A is an alkali metal, H is a proton, $M^a$ and $M^b$ are transition metals, $M^c$ is a dopant such as Mg, Ca, Sr, Ba, Al, Cr, Y, Zr, Nb, Hf, and/or Ti, y is less than or equal to x, and z+t≤1. The transition metals $M^a$ and $M^b$ in the non-stoichiometric metal oxide can, for example, include a transition metal such as Ni, Co, Mn, and/or Fe. In some embodiments, the non-stoichiometric metal oxide can include one or more types of transition metal (e.g., a non-stoichiometric mixed metal oxide), in any combination. For example, the non-stoichiometric metal oxide can have the general formula $Li_{0.7}H_{0.2}Ni_{0.8}Co_{0.2}O_2$. In some embodiments, the non-stoichiometric metal oxide can include both Mn and protons, and has the general formula $A_{1-x}H_yMnO_2$, $A_{1-x}H_yMn_2O_4$, $A_{1-x}H_yMn_4O_9$, or $A_{1-x}H_yMn_5O_{12}$.

Figure 2:
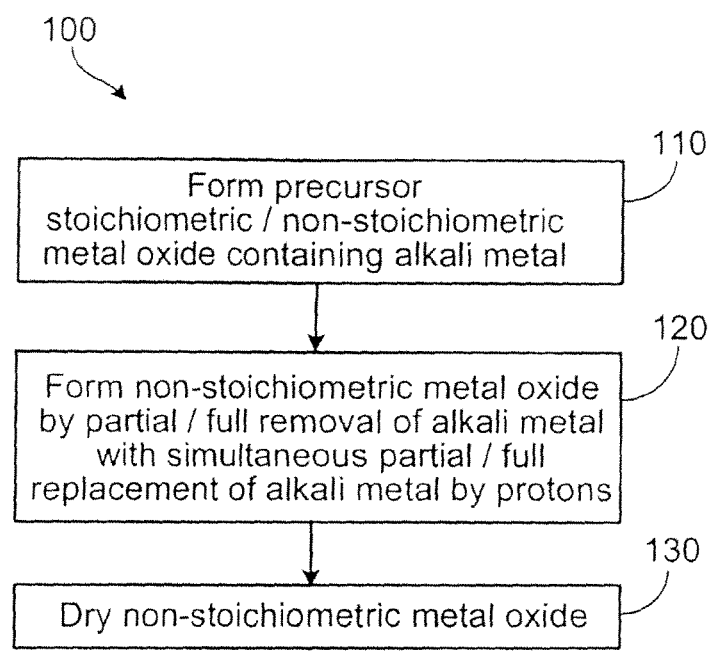
FIG. 2 is a flow chart of an embodiment of a method of making a non-stoichiometric metal oxide.

The alkali metal ion content of the non-stoichiometric metal oxide can be deficient and the alkali metal ions partially replaced by protons. FIG. 2 shows a schematic representation for the synthesis of a non-stoichiometric metal oxide including transition metals having an average oxidation state, ≥+3 and partially or fully extracted alkali metal. The alkali metal can be Li, Na, K, Cs, and/or Rb). The non-stoichiometric metal oxide can include more than one type of alkali metal, in any combination, for example, by ion substitution or ion exchange. In some embodiments, the non-stoichiometric metal oxide can include a mixture of alkali metals and a mixture of transition metals. For example, the non-stoichiometric metal oxide can have the general formula $Li_{1-x}Na_xH_yM^a_{1-z-t}M^b_zM^c_tO_2$, where H is a proton, $M^a$ and $M^b$ are transition metals, $M^c$ is a dopant and x, y, z, and t can each vary between 0 and 1, and where 0≤(x+y+z+t)≤1. In some embodiments, the dopant $M^c$ can be a non-transition metal, for example, Al, Mg, Ca, Sr, Ba, and combinations thereof.

In some embodiments, x, z, and t can be each independently greater than 0 (e.g., greater than 0.1, greater than 0.3, greater than 0.5, greater than 0.6, or greater than 0.8) and/or less than 1 (e.g., less than 0.8, less than 0.5, less than 0.6, less than 0.3, or less 0.1). In some embodiments, y can be less than or equal to x. In some embodiments, y can be greater than 0 (e.g., greater than 0.1, greater than 0.3, greater than 0.5, greater than 0.6, or greater than 0.8) and/or less than 1 (e.g., less than 0.8, less than 0.5, less than 0.6, less than 0.3, or less 0.1).

In some embodiments, the content of the transition metals and alkali metals in the non-stoichiometric metal oxide can be determined by, inductively coupled plasma atomic emission spectroscopy ("ICP-AE") and/or atomic absorption spectroscopy ("AA") using standard methods as described, for example, by J. R. Dean (*Practical Inductively Coupled Plasma Spectroscopy*, Chichester, England: Wiley, 2005, 65-87) and B. Welz and M. B. Sperling (*Atomic Absorption Spectrometry*, 3$^{rd}$ ed., Weinheim, Germany: Wiley VCH, 1999, 221-294), For example, ICP-AE spectroscopy measurements can be performed using a Thermo Electron Corporation IRIS intrepid II XSP ICP with Cetac ASX-510 autosampler attachment. For non-stoichiometric metal oxide samples including manganese, lithium, and nickel, ICP-AE analysis can be performed separately for Mn (λ=257.610 nm), Li (λ=670.784 nm), Co (λ=228.616 nm) and Ni (λ=221.647 nm). Analysis of non-stoichiometric metal oxide samples for metals can be performed by a commercial analytical laboratory, for example, Galbraith Laboratories, Inc. (Knoxville, Tenn.). Hydrogen content can be analyzed using a type of neutron activation analysis known as "PGAA (Prompt Gamma-ray Activation Analysis) at University of Texas—Austin using the general methods described, for example, by G. L. Molnar (*Handbook of Prompt Gamma Activation Analysis*, Dordrecht, The Netherlands: Kluwer Academic Publishers, 2004). The average oxidation state of the transition metals (e.g., Ni/Co) in the non-stoichiometric metal oxide can be determined by chemical titrimetry using ferrous ammonium sulfate and standardized potassium permanganate solutions as described, for example, by A. F. Dagget and W. B. Meldrun (Quantitative Analysis, Boston: Heath, 1955, 408-9). The average oxidation state of the transition metals also can be determined indirectly from the specific gravimetric capacity observed for coin cells including the non-stoichiometric metal oxide as the cathode active material, Li metal as the anode active material, and a non-aqueous electrolyte (e.g., FIG. 17, vide infra).

The transition metal (e.g., Ni, Co. Mn, and/or Fe) in a non-stoichiometric metal oxide can have multiple oxidation states. For example, the transition metal (e.g., Ni, Co, Mn, and/or Fe) can have an average positive oxidation state of greater than 3 greater than 3.2, greater than 3.5, or greater than 3.8) and/or less than or equal to 4 (less than 3.8, less than 3.5, or less than 3.2). In embodiments where the non-stoichiometric metal oxide includes Mn in the general formula $A_{1-x}H_yMnO_2$ or $A_{1-x}H_yMn_2O_4$, can have an average positive oxidation state of ≥3 and/or ≤4. The transition metal of the non-stoichiometric metal oxide can have a higher average oxidation state than the corresponding precursor metal oxide, prior to removal of alkali metal, cation A. For example, Ni in $Li_{0.3}H_{0.2}NiO_2$ can have a higher average oxidation state (e.g., 3.5) than Ni in $LiNiO_2$ (e.g., 3). In some embodiments, the average oxidation state of the transition metal in the non-stoichiometric transition metal oxide can be 0.3 greater (e.g., 0.5 greater, 0.8 greater, or 0.9 greater) than the average oxidation state of the transition metal in the corresponding precursor metal oxide.

In some embodiments, the total metal content (e.g., Ni, Co, Mn, Al, and/or Fe) in the non-stoichiometric metal oxide contains at least one atomic percent (e.g., at least 10, 50, or 90 percent) of a transition metal having a nominally tetravalent oxidation state. In some embodiments, the transition metal content (e.g., Ni, Co, Mn, and/or Fe) in the non-stoichiometric metal oxide can contain at most 90 atomic percent (e.g., at most 70, 50, or 10 atomic percent) of the transition metal having a nominally trivalent oxidation state.

Referring to Table 1, the non-stoichiometric metal oxides can provide battery 10 with a high volumetric energy density, where the theoretical volumetric energy density can be higher than commercial alkaline zinc primary cells including EMD/Zn, β-NiOOH or γ-NiOOH/Zn and can have a commercially useful average running voltage (e.g., a closed circuit voltage, "CCV") of between about 0.8 and 1.8V. Referring to Table 1, the difference in values between the capacities reported for EMD in rows 5 and 6 results from the number of electrons exchanged ("NFE") in the reduction process during discharge (e.g., 1 electron/Mn or the theoretical value of 1.33 electrons/Mn).

delithiation, non-stoichiometric nickel oxide prepared by oxidative delithiation of $LiNiO_2$ in the absence of water can have a $CdCl_2$-related layered structure. A $Li_{1-x}H_yNiO_2$ prepared by delithiation of a layered $LiNiO_2$, can have either a layered structure related to that of layered $LiNiO_2$, or a spinel-type structure, depending on the drying conditions.

In some embodiments, the non-stoichiometric metal oxides can have, a layered crystal structure with alkali metal ions located in interlayer lattice sites. The non-stoichiometric metal, oxide also can have defects where alkali metal ions have been extracted. In some embodiments, the alkali metal ions can be partially replaced by protons in the crystal lattice. The interlayer spacing distance can be either maintained or changed after oxidative deintercalation of alkali metal ion, proton intercalation, and/or alkali metal ion/proton exchange. In some embodiments, the interlayer spacing can increase due to substitution by alkali ions having

TABLE 1

Theoretical gravimetric specific capacities and volumetric energy densities for selected Ni and Mn oxides in alkaline batteries

| Nominal composition of cathode active material | Average oxidation state of metal | Number of electrons exchanged (NEE) | Theoret. specific capacity (Ah/g) | Average voltage vs. Zn (V) | True density (pycn.) (g/cc) | Energy density, active (Wh/cc) |
|---|---|---|---|---|---|---|
| NiOOH | +3 | 1 | 0.292 | 1.55 | 4.1 | 1.85 |
| $Li_{1-x}H_yNiO_2$, x = 1, y = 0 | +4 | 2 | 0.591 | 1.45 | >4.8 | 4.16 |
| $Li_{1-x}H_yNiO_2$, [(1-x) + y] = 0.5 | +3.5 | 1.5 | 0.433 | 1.45 | 4.8 | 3.02 |
| EMD (γ-$MnO_2$) | +4 | 1 | 0.308 | 1.2 | 4.45 | 1.65 |
| FMD (γ-$MnO_2$) | +4 | 1.33 | 0.410 | 1.2 | 4.45 | 2.19 |

Figure 3:
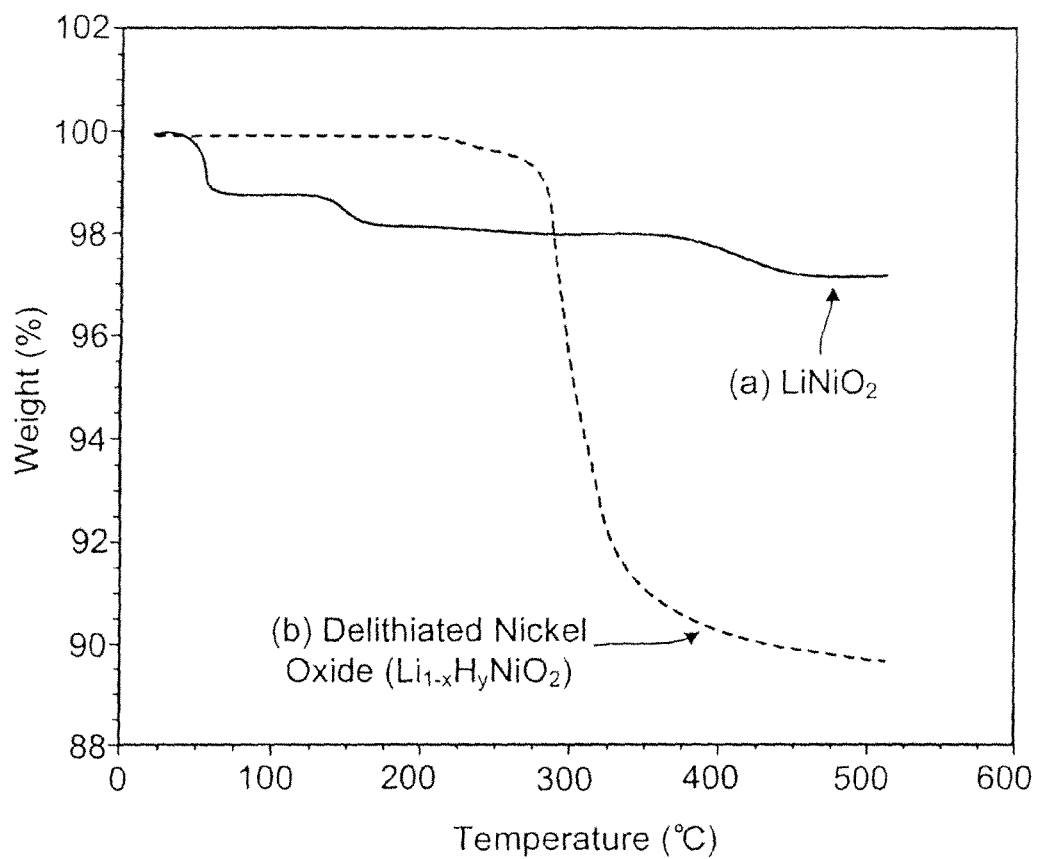
FIG. 3 shows thermo-gravimetric patterns in air at a heating rate of 10° C./minute of an embodiment of (a) a precursor metal oxide with nominal composition $LiNiO_2$ prepared at 800° C. in oxygen for 48 h; and (b) the corresponding non-stoichiometric metal oxide $Li_{1-x}H_yNiO_2$.

The non-stoichiometric metal oxide can have low solubility (e.g., less than 300 ppm, less than 100 ppm, or less than 50 ppm) in alkaline electrolyte, depending on the specific transition metal. As a result, battery 10 can have good ambient shelf life. The non-stoichiometric metal oxide can be thermally stable in an up to a temperature greater than about 100° C. (e.g., greater than about 150° C.). The thermal stability of the non-stoichiometric metal oxide can be determined using thermogravimetric analysis ("TGA"). For example, referring to FIG. 3, the TGA patterns were obtained by heating samples of (a) precursor $LiNiO_2$ prepared at 800° C./in oxygen and (b) the corresponding delithiated product having a general formula of $Li_{1-x}H_yNiO_2$ in air at a heating rate of 10° C./minute. Without wishing to be bound by theory, it is believed that a non-stoichiometric metal oxide having good thermal stability can be indicative of an overall thermodynamic stability of the crystal lattice of the metal oxide and the chemical stability of the metal oxide in the presence of alkaline electrolyte and other components of the battery (e.g., separator, conductive additives).

The non-stoichiometric metal oxide can have a spinel-type structure; a layered structure; an intergrowth structure, or can include a physical mixture of spinel, layered, and/or intergrowth structures, as well as other related crystal structures. For example, β-nickel oxyhydroxide γ-nickel oxyhydroxide can hast a layered structure. As further examples, $A_{1-x}H_yMn_2O_4$, $A_{1-x}H_yMn_4O_9$, and/or $A_{1-x}H_yMn_5O_{12}$ can have spinel-type structures; $A_{1-x}H_yMnO_2$ can have a spinel type, a layered, an intergrowth, or a related crystal structure; and $Li_{1-z}H_yMn_{1-x-y}M^a_xM^b_yO_2$ can have a layered structure. A λ-$MnO_2$ derived from a spinel-type lithium manganese oxide precursor can retain the spinel-type structure after larger ionic radii. For example, the interlayer spacing can increase when Li ions are substituted by larger cesium (Cs) ions. In some embodiments, the interlayer spacing in non-stoichiometric lithium hydrogen metal oxides can increase due to increased electrostatic repulsion between the oxygen-containing layers after Li removal.

In some embodiments, crystal lattice parameters of the non-stoichiometric metal oxide can be determined from powder. X-ray diffraction ("XRD") patterns. For example, X-ray powder diffraction patterns can be measured with an X-ray diffractometer (e.g., Bruker D-8 Advance X-ray diffractometer, Rigaku Miniflex diffractometer) using Cu $K_\alpha$ or Cr $K_\alpha$ radiation by standard methods described, for example, by B. D. Cullity and S. R. Stock (*Elements of X-ray Diffraction*, 3$^{rd}$ ed., New York: Prentice Hall, 2001). The unit cell parameters can be determined by Rietveld refinement of the powder diffraction data. The X-ray crystallite size also can be determined by analysis of peak broadening in a powder diffraction pattern of a sample containing an internal Si standard using the single-peak Scherrer method or the Warren-Averbach method as discussed in detail, for example, by H. P. Klug and L. E., Alexander (*X-ray Diffraction Procedures for Polycrystalline and Amorphous Materials*, New York: Wiley, 1974, 618-694). In some embodiments, a layered, non-stoichiometric $Li_{1-x}H_yNiO_2$ can have an X-ray diffraction pattern indicating that interlayer spacing has changed relatively little on deintercalation of $LiNiO_2$. For example, the 003 Miller index line at the approximate diffraction angle of 2θ=18.79° can remain almost at the same angle while other Miller index (e.g., hk0) lines can show a larger shift, indicating a relatively minor change in the a and/or b unit cell parameters axis of the lattice. The extent of structural distortion also can depend on the average nickel oxidation state, the site occupancy of the lithium ions and protons, as well as total lithium ion/proton content. For example, referring to FIG. 4, the powder X-ray diffraction patterns of (a) the precursor $LiNiO_2$ heated at 800° C. in oxygen for 48 hours and (b) the delithiated product indicating that overall structural integrity was maintained after lithium extraction, with only minor changes in the unit cell parameters. As another example, referring to FIG. 5, the powder X-ray diffraction patterns for (a) delithiated $LiNiO_2$ (b) delithiated $LiNi_{0.8}Co_{0.2}O_2$, (c) $\gamma$-NiOOH, and (d) $\beta$-NiOOH, respectively, clearly indicate that the two delithiated nickel-oxides have different crystal structures than $\gamma$-NiOOH or $\beta$-NiOOH.

Figure 6A:
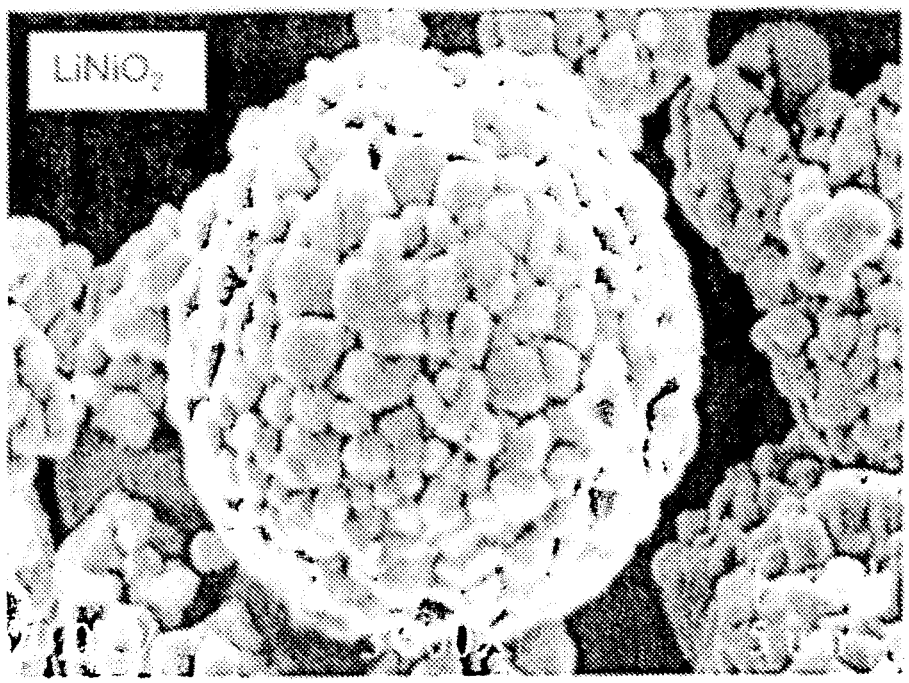
FIG. 6A shows microscopic images of an embodiment of precursor $LiNiO_2$ (prepared at 800° C., 48 h in oxygen atmosphere)
Figure 6B:
FIG. 6B shows the corresponding delithiated nickel oxide.
Figure 6B:
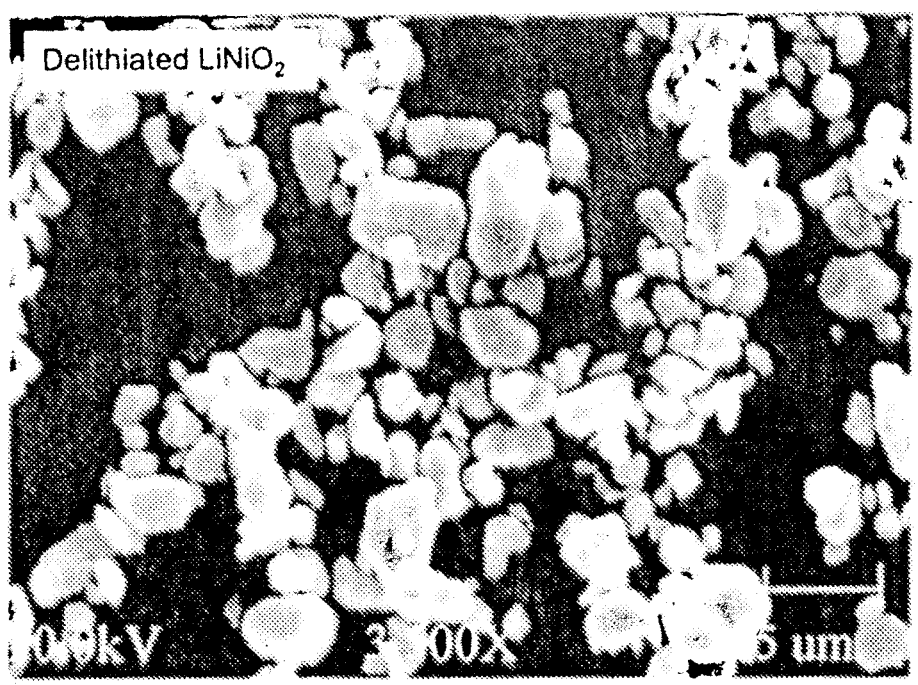

In some embodiments, the mean particle size and size distribution for a non-stoichiometric metal oxide and the corresponding alkali metal-containing precursor can be determined with a laser diffraction particle size analyzer (e.g., SympaTec Helos particle size analyzer equipped with a Rodos dry powder dispersing unit) using algorithms based on Fraunhofer or Mie theory to compute the volume distribution of particle sizes and mean particle sizes. Particle size distribution and volume distribution calculations are described, for example, in M. Puckhaber and S. Rothele (Powder Handling & Processine, 1999, 11(1), 91-95 and European Cement Magazine, 2000, 18-21). Typically, the alkali metal-containing precursor can consist of an agglomerate or a sintered aggregate (i.e., secondary particles) composed of much smaller primary particles. Such agglomerates and aggregates are readily measured using the particle size analyzer. In some embodiments, scanning electron microscopy ("SEM") can, be used to determine the morphology of particles of a metal oxide. For example, referring to FIG. 6A, SEM image revealed that the non-stoichiometric metal oxide precursor powder (e.g., $LiNiO_2$ heated at 800° C., 48 hours in oxygen) included spherical aggregates (i.e., secondary particles) composed of non-spherical primary particles. The non-spherical primary particles can have an average particle size of 3 microns. Referring to FIG. 6B, removal of alkali metal ions can cause deaggregation of the secondary particles producing, smaller non-spherical primary particles. The average particle size of the primary particles can depend directly on the heating temperature and time during preparation of the alkali metal-containing precursor.

True densities of a non-stoichiometric metal oxide and the corresponding alkali metal-containing precursor metal oxide can be measured by a He gas pycnometer (e.g., Quantachrome tiltnapyc Model 1200e) as described in general by P. A. Webb ("Volume and Density Determinations for Particle Technologists", Internal Report, Micromeritics Instrument Corp., 2001, pp. 8-9) and in, for example, ASTM Standard D5965-02 ("Standard Test Methods for Specific Gravity of Coating Powders", ASTM International, West Conshohocken, Pa., 2007) and ASTM Standard B923-02 ("Standard Test Method for Metal Powder Skeletal Density by Helium or Nitrogen Pycnometry", ASTM International, West Conshohocken, Pa., 2008). True density is defined, for example, by the British Standards Institute, as the mass of a particle divided by its volume, excluding open and, closed pores.

Referring to FIG. 2, In some embodiments, the non-stoichiometric metal oxide is prepared starting with the synthesis of the corresponding, precursor metal oxide (e.g., step 100), by heating a mixture of one or more alkali hydroxides (e.g., LiOH) and one or more metal hydroxides (e.g., $Ni(OH)_2$) in an, oxygen atmosphere at a temperature greater than 400° C. (e.g., greater than 500° C., greater than 700° C. or greater than 800° C.). In some embodiments, the molar ratio of the alkali hydroxide to the metal hydroxide can be 1:1. In some embodiments, a precursor metal, oxide containing one or more transition metals (e.g., Ni, Co, and/or Mn) can be prepared from a mixture of metal hydroxides (e.g., $Ni(OH)_2$, $Co(OH)^2$, and/or $Mn(OH)_2$) in a required mole ratio and an alkali metal hydroxide. A mixture of metal hydroxides can be prepared, for example, from an aqueous solution of the corresponding soluble metal salts by increasing the pH.

In certain embodiments, the precursor metal oxide particles can be plate-shaped, having dimensions (e.g., thickness, length, and width) that can be varied depending on the heating temperature. For example, a high relative reaction temperature can produce large size non-spherical particles. In certain embodiments, precursor metal oxides can be obtained from different commercial suppliers, for example, Umex, Inc. (Fort Saskatchewan, Alberta, Canada), NEI Corporation (Somerset, N.J.), Tanaka Chemical Corp, (Fukui, Japan), LICO Technology Corp. (Taiwan), 3M (St. Paul, Minn.), and/or FMC (Charlotte, N.C.).

Delithiation of a precursor alkali metal-containing metal oxide by acid-treatment can include addition of the precursor metal oxide powder to an aqueous sulfuric acid solution to form a slurry with constant stirring at a temperature of 25° C. or less, 15° C. or less, 10° C. or less (e.g., between 0 and 5° C.) for a period of time (e.g. 12 hours) depending on the concentration and the total volume of the acid solution. In some embodiments, the acid solution can, be pre-cooled before addition of the precursor metal oxide powder. In other embodiments, acid treatment can occur under an inert atmosphere (e.g., nitrogen, argon). After the acid treatment, the non-stoichiometric metal oxide product powder can be washed, collected, and dried.

Referring to FIG. 2, the precursor alkali metal-containing metal oxide can be treated with an aqueous acid to oxidatively deintercalate essentially all or a portion, of the alkali metal to form the non-stoichiometric metal oxide (e.g., step 110). The aqueous acid solution can have a concentration of 1M or more (e.g., 3M or mom, 6M or more, 8M or more, or 10M or more) and/or 12M or less (e.g., 10M or less, 8M or less, 6M or less, or 3M or less). In some embodiments, the concentration of the aqueous acid solution can be between 0.1 M and 10 M (e.g., between 1 M and 10 M, or between 4 M and 8 M). The aqueous acid solution can include a strong, oxidizing mineral acid, for example, sulfuric acid, nitric acid, hydrochloric acid, perchloric acid, and (Acura (i.e., fuming sulfuric acid). In addition to extraction of alkali metal, ions from the precursor metal oxide, treatment with the aqueous acid solution can be used to remove metallic impurities. A preferred acid solution is 6 M sulfuric acid.

Acid treatment can be performed at temperatures ranging from 0 to 25° C. (e.g., 0 to 20° C., 0 to 15° C., 0 to 10° C., 0 to 5° C., 0 to 3° C., 0 to 1° C.) for a duration of greater than 0.25 hour (e.g., greater than 1 hour, greater than 12 hours, greater than 24 hours, or greater than 48 hours) and/or less than 72 hours (e.g, less than 48 hours, less than 24 hours, less than 12 hours, or less than 1 hour).

In some embodiments, the average oxidation state of a transition metal in a non-stoichiometric metal oxide can be increased, by acid treatment of the precursor metal oxide. Without wishing to be bound by theory, it is believed that during acid treatment, protons can partially exchange with alkali metal ions thereby stabilizing the crystal structure of the non-stoichiometric metal oxide. Further, in some embodiments, transition metal ions (e.g., Mn, Ni) having an average oxidation state of two can be formed during acid treatment and can dissolve in the aqueous acid solution.

After stirring the precursor metal oxide powder with aqueous acid for a specific time, the non-stoichiometric metal oxide can be isolated (e.g., by filtration, by centrifugation, by sedimentation and decantation), and washed repeatedly with portions of water (e.g., deionized water, distilled water) until the pH of the washings is 4 or more (e.g., 5 or more, 6 or more, or 7 or more) and/or 8 or less (e.g., 7 or less, 6 or less, 5 or less, or 4 or less). In some embodiments, the pH of the final washing can be between two and seven (e.g., between three and seven, between four and seven, or between five and seven). In some embodiments, the non-stoichiometric metal oxide can be washed with an aqueous base solution, for example, NaOH, KOH, $NH_4OH$, and mixtures thereof. The aqueous base solution can have a concentration of about 0.1 M or more (e.g., 0.2 M or more, 0.5 M or more, 0.7 M or more, or M or more) and/or 2 M or less (e.g., 1 M or less, 0.7 M or less, 0.5 M or less, or 0.2 M or less). The pH of the base solution washings can be 8 or more (e.g., 9 or more, 10 or more, or 11 or more) and/or 12 or less (e.g., 11 or less, 10 or less, 9 or less, or 8 or less). The final pH of the washings can be between 6 and 8.

Figure 7:
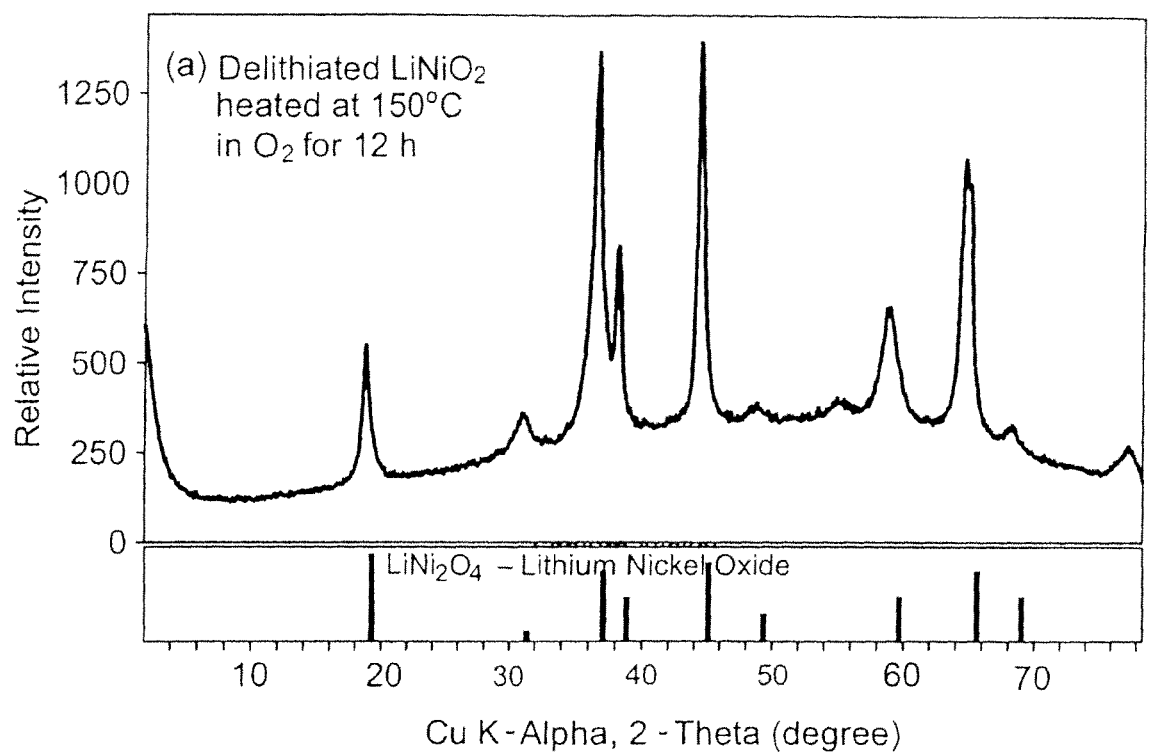
FIG. 7 shows powder X-ray diffraction patterns of an embodiment of (a) a non-stoichiometric metal oxide thermally annealed in oxygen atmosphere at 150° C. for 12 hours; and (b) a reference diffraction pattern for a spinel-type $LiNi_2O_4$.

In some embodiments, the formed non-stoichiometric metal oxide can be dried at various temperatures for a specified time. The drying temperature can range from 60° C. from 100° C., from 150° C., or from 200° C.) to 300° C. (e.g., to 200° C., to 150° C., or to 100° C.). The drying temperature and oxygen partial pressure can be selected so as to provide a particular crystal structure. For example, drying at 150° C. in an oxygen atmosphere can provide a non-stoichiometric metal oxide with a spinel-related crystal structure, whereas drying at a temperature >150° C. in an oxygen atmosphere can provide a mixture of phases, such as spinel-type $LiNi_2O_4$, layered non-stoichiometric $Li_{1+x}NiO_2$, rocksalt-type NiO, and other phases. Referring to FIG. 7, the powder X-ray diffraction pattern for a delithiated $LiNiO_2$ thermally annealed in an oxygen atmosphere at 150° C. for 12 hours can be comparable to that for spinel-type $LiNi_2O_4$ (Powder Diffraction File #41-0890, available from. International Center for Diffraction Data, Newton Square, Pa.). In some embodiments, the specific capacity of the cathode active material can vary with the drying conditions (e.g., partial oxygen pressure and/or drying temperature).

In some embodiments, the acid treatment process including the steps of washing and drying can be repeated multiple times, for example, two times or more or three times or more. The non-stoichiometric metal oxide resulting from repeated acid treatment can have greater purity, greater B.E.T. specific surface area, and/or larger average pore diameter relative to the alkali metal-containing precursor metal oxide. The specific surface areas of a non-stoichiometric metal oxide and the corresponding precursor metal oxide can be determined by the multipoint B.E.T. $N_2$ adsorption isotherm method described, for example, by P. W. Atkins (*Physical Chemistry*, 5$^{th}$ edn., New York: W. H. Freeman & Co., 1994, pp. 990-992) and S. Lowell et al. (*Characterization of Porous Solids and Powders: Powder Surface Area and Porosity*, Dordrecht, The Netherlands: Springer, 2006, pp. 58-80). The B.E.T. surface area method measures the total surface area on the exterior surfaces of particles and includes that portion of the surface area defined by open pores within the particle accessible for gas adsorption and desorption in some embodiments, the specific surface area of the non-stoichiometric metal oxide can be substantially greater than that of the precursor metal oxide. An increase in specific surface area can be correlated with an increase in surface roughness and porosity, which also can be assessed by analyzing the microstructure of the metal oxide particles as imaged by scanning electron microscopy (e.g., SEM micrographs at about 10,000× magnification). Porosimetric measurements can be performed on the metal oxide powders to determine cumulative pore volumes, average pore sizes (i.e., diameters), and pore size distributions. Pore sizes and pore size distributions can be calculated by applying various models and computational methods (e.g., BM, DU, DR, HK, SF, etc.) to analyze the data from the measurement, of $N_2$ adsorption and/or desorption isotherms, as discussed, for example, by S. Lowell et al. (*Characterization of Porous Solids and Powders: Powder Surface Area and Porosity*, Dordrecht, The Netherlands: Springer, 2006 pp. 101-156).

In some embodiments, cathode 12 can include between 50 percent and 95 percent by weight (e.g., between 60 percent and 90 percent by weight, between 70 percent and 85 percent by weight) of the cathode active material, Cathode 12 can include greater than or equal to 50, 60, 70, 80, or 90 percent by weight, and/or less than or equal to 95, 90, 80, 70, or 60 percent by weight of the cathode active material. Cathode 12 can include one or more (e.g., two, three or more) non-stoichiometric metal oxides, in any combination. For example, cathode 12 can include a mixture of $Li_{1-x}H_yNi_{1-t}M^c_tO_2$, $Li_{1-x}H_yCo_{1-t}M^c_tO_2O_2$, and/or $Li_{1-x}H_yNi_{1-x-t}Co_zM^c_tO_2$, where $M^c$ is Mg, Al, Nb, and/or Ti.

One or more non-stoichiometric metal oxides can make up all of the active material of cathode 12, or a portion of the active material of cathode 12. For example, the active material of cathode 12 can include a blend of non-stoichiometric metal oxide(s) and a γ-$MnO_2$ (e.g., EMD, CMD, or a mixture of EMD and CMD). The EMD can be an EMD having a high power coefficient as described, for example, in U.S. Pat. No. 6,509,117, herein incorporated by reference in its entirety. The EMD can be an acid-treated EMD and/or an ozone-treated EMD. The non-stoichiometric metal oxide can increase average running voltage and/or volumetric energy density of a battery containing EMD. In some embodiments, for example, the specific discharge capacity for voltages greater than about 0.8 V can be increased substantially compared to alkaline cells containing EMD as the sole active cathode material. In a cathode including a mixture or blend of active materials, the non-stoichiometric metal oxide can include peater than about one percent to less than about 100 percent by weight of the active materials. For example, cathode 12 can include greater than 0%, 1%, 5%, 10%, 20%, 50%, or 70% by weight of the non-stoichiometric metal oxide(s); and/or less than or equal to about 100%, 70%, 50%, 20%, 10%, 5%, or 1% by weight of the non-stoichiometric metal oxide(s). Other examples of suitable cathode active materials that can be used in combination with the non-stoichiometric metal oxide(s) can be selected from β-NiOOH, γ-NiOOH, AgO, $Ag_2O$, $AgNiO_2$, $AgCoO_2$, $AgCo_xNi_{1-x}O_2$, and combinations thereof.

In some embodiments, cathode 12 can include a blend or composite of non-stoichiometric metal oxide and one or more additional cathode active materials, and can further include an electrically conductive additive and optionally a polymeric binder. As used herein, a blend refers to a physical mixture of two or more cathode active materials, where the panicles of the two or more cathode materials are physically mechanically) interspersed to form a nominally homogeneous assemblage of particles on a macroscopic scale, wherein each type of particle retains its original chemical composition. Such blends are described, for example, by S. Komaba et al. (Electrochimica Acta, 2005, 50, 2297-2305). When incorporated into an alkaline battery, the blend can provide the battery with improved overall battery discharge performance relative to batteries including only a single cathode active material component of the blend. For example, in some embodiments, a battery that includes a blend can have improved fresh discharge capacity, increased closed circuit voltage ("CCV"), increased average discharge voltage (i.e, voltage at 50% depth of discharge, "DOD"), and/or an overall improved discharge performance compared to a battery that includes a single cathode active material of the blend.

As used herein, a composite refers to a multiphase material formed by combining two or more cathode active materials, where the particles of the two or more cathode active materials are bonded together to form a nominally homogeneous assemblage on a microscopic scale. The composite has multiple interfaces between particles, such that the two or more cathode active materials can act in concert to provide improved or synergistic discharge performance characteristics. The composition of each particle in the composite can differ from that of the original precursor particle prior to formation of the composite. A composite including two or more cathode active materials bonded together either chemically or physically can form an intergrowth, of particles. The intergrowth of particles has multiple and extensive interfacial contacts between the particles on a micron to nanometer dimension scale, as described, for example, by S. Komaba et al, (Electnochimica Acta, 2005, 50, 2297-2305). When incorporated into an alkaline battery, the composite can provide a battery having improved overall discharge performance relative to batteries including particles of a single cathode active material component of the composite, or to batteries including a blend. For example, in some embodiments, a battery that includes a composite can have increased discharge capacity, CCV, and average discharge voltage, and/or an overall improved discharge performance compared to a battery that includes a blend in the same nominal weight ratio. Composites and blends are also described, for example, in U.S. application Ser. No. 12/722,726 (corresponding to U.S. Patent Publication No. 2011/0223477), filed concurrently with the present application.

To prepare a composite including non-stoichiometric metal oxide and one or more additional cathode active materials, a blend or mixture of suitable precursors to the non-stoichiometric metal oxide and the one or more additional cathode active materials can be treated, for example, with, an aqueous acid solution at low temperature, to simultaneously generate $Li_{1-x}H_yNiO_2$, and the one or more additional cathode active materials in the form of a composite. A mixture of precursors can be prepared manually, for example, using a mortar and pestle or mechanically using typical powder mixing equipment such as a V-blender, a stirred ball mill, a roller or jar mill, a blade mill, a high-energy ball mill, a planetary ball mill, a centrifugal ball mill, a shaker-mixer, a vibroenergy mill, and the like. In some embodiments, one or more components of the mixture can be subjected to additional milling to reduce particle size in order to increase reactivity during acid treatment.

In some embodiments, the mixture of precursors can include a lithium nickel dioxide (e.g., $LiNiO_2$) and a commercial EMD. The mixture can have a $LiNiO_2$ to EMD weight ratio of 9:1 or less (e.g., 4:1 or less, 7:3 or less, 1:1 or less) and/or 1:19 or more (e.g., 1:9 or more, 1:4 or more, 3:7 or more, 1:1 or more). For example, the mixture can include 5% or more (e.g., 10% or more, 20% or more, 30% or more, 50% or more) and/or 95% or less (e.g., 90% or less, 80% or less, 70% or less, 50% or less) by weight of $LiNiO_2$. The mixture can include 10% or more (e.g., 20% or more, 30% or more, 50% or more) and/or 95% or less (e.g., 90% or less, 80% or less, 70% or less, 50% or less) by weight EMD. After the acid extraction treatment, the weight ratio of $Li_{1-x}H_yNiO_2$ to acid-treated EMD in the composite can differ from the initial weight ratio of $LiNiO^2$ to EMD in the starting mixture because of dissolution of both $Ni^{2+}$ and Li+ ions in the aqueous acid solution.

Composites of $Li_{1-x}H_yNiO_2$ and acid-treated EMD can be used to provide batteries having higher initial CCV values than batteries including either or commercial EMD or acid treated EMD as the only cathode active material and/or having average gravimetric discharge capacities greater than batteries including either acid-treated or untreated EMD as the only cathode active material. For example, a battery including a composite of $Li_{1-x}H_yNiO_2$ and acid-treated EMD can have an average gravimetric capacity of 2% or more (e.g., 5% or more, 10% or more, 15% or more) than a battery including acid-treated EMD as the only cathode active material, when discharged at a relative low rate (e.g., 10 mA/g total active) to a 0.8 V cutoff voltage. In some embodiments, a battery including a composite of and acid-treated EMD can have an average gravimetric capacity of 1% or more (e.g., 2% or more, 3% or more, 5% or more) than a battery including a blend of $Li_{1-x}H_yNiO_2$ and acid-treated EMD having the same nominal weight ratio.

In some embodiments, a composite of $Li_{1-x}H_yNiO_2$, and acid-treated EMD can provide a battery having increased average discharge capacity relative to a sum of the anticipated proportional capacities of batteries including either $Li_{1-x}H_yNiO_2$ or acid-treated EMD as the only cathode active material.

In some embodiments, the mixture of precursors to the cathode active materials in the composite can include a nominally stoichiometric $LiMn_2O_4$ spinel and $LiNiO_2$. Treatment of a mixture of $LiMn_2O_4$ spinel and $LINiO_2$ with an aqueous acid solution at low temperature can simultaneously generate a composite including) $\lambda$-$MnO_2$ and $Li_{1-x}H_yNiO_2$ where $0.1 \leq x \leq 0.9$, $0.1 \leq y \leq 0.9$ Ni has an average nickel oxidation state greater than +3 and less than +4 (e.g., between +3.20 and +3.80, between +150 and +3.75). The composite can have a $\lambda$-$MnO_2$ to $Li_{1-x}H_yNiO_2$ weight ratio of 19:1 or less (e.g., 9:1 or less, 4:1 or less; 7:3 or less; 1:1 or less) and/or 1:9 or more (e.g., 1:4 or more, 3:7 or more, 1:1 or more). For example, the composite can include 10% or more (e.g., 20% or more, 30% or more, 50% or more) and/or 95% or less (e.g., 90% or less, 80% or less, 70% or less, 50% or less) by weight $\lambda$-$MnO_2$. The composite can include 5% or more (e.g., 10% or more, 2.0% or mom, 30% or more, 50% or more) and/or 90% or less (e.g., 80% or less, 70% or less, 50% or less) by weight $Li_{1-x}H_yNiO_2$.

A battery including a composite of $\lambda$-$MnO_2$ and $Li_{1-x}H_yNiO_2$ can provide a substantially higher initial dosed circuit voltage ("CCV") or running voltage as well as a greater average gravimetric capacity when discharged at a relative low rate (e.g., 10 mA/g total active) to a 0.8 V cutoff voltage than a battery including $\lambda$-$MnO_2$ as the only cathode active material. Further, a battery including a composite of $Li_{1-x}H_yNiO_2$ can have a lower OCV value than a battery including $Li_{1-x}H_yNiO_2$ as the only cathode active material. Typically, batteries with lower OCV values undergo less self-discharge via decomposition of electrolyte to generate oxygen gas during storage and can have improved shelf life.

In some embodiments, to enhance bulk electrical conductivity and stability of the cathode, particles of the cathode active materials can include an electrically conductive surface coating. Increasing electrical conductivity of the cathode can enhance total discharge, capacity and/or average running voltage of battery 10 (e.g., at low discharge rates), as well as enhance the effective cathode utilization (e.g., at high discharge rates). The conductive surface coating can include a carbonaceous material, such as a natural or synthetic graphite, a carbon black, a partially graphitized carbon black, and/or an acetylene black. The conductive surface coating can include a metal, such as gold or silver and/or a conductive or semiconductive metal oxide, such as cobalt oxide (e.g., $Co_3O_4$), cobalt oxyhydroxide, silver oxide, antimony-doped tin oxide, zinc antimonate or indium tin oxide. The surface coating can be applied or deposited, for example, using solution techniques including electrodeposition, electroless deposition, by vapor phase deposition (e.g., sputtering, physical vapor deposition, or chemical vapor deposition) or by direct coating conductive particles to the surface of the active particles using a binder and/or coupling agent as described, for example by J. Kim et al. (Journal of Power Sources, 2005, 139, 289-294) and R. Dominko et al. (Electrochemical and Solid State Letters, 2001, 4(11), A187-A190). A suitable conductive coating thickness can be provided by applying the conductive surface coating at between 3 and 10 percent by weight (e.g., greater than or equal to 3, 4, 5, 6, 7, 8, or 9 percent by weight, and/or less than or equal to 10, 9, 8, 7, 6, 5, or 4 percent by weight) relative to the total weight of the cathode active material.

In addition, as indicated above, cathode 12 can include an electrically conductive additive capable of enhancing the bulk electrical conductivity of cathode 12. Examples of conductive additives include graphite carbon black, silver powder, gold powder, nickel powder, carbon fibers, carbon turnofibers, and/or carbon nanotubes. Preferred conductive additives include graphite particles, graphitized carbon black particles, carbon nanofibers, vapor phase grown carbon fibers, and single and multiwall carbon nanotubes. In certain embodiments, the graphite particles can be non-synthetic (i.e., "natural"), nonexpanded graphite particles, for example, NdG MP-0702X available from Nacional de Grafite (Itapecirica, Brazil) and FormulaBT™ grade available from Superior Graphite Co. (Chicago, Ill.). In other embodiments, the graphite particles can be expanded natural or synthetic graphite particles, for example, Tirrirex® BNB90 available from Timcal, Ltd. (Bodio, Switzerland), WH20 or WH20A grade from Chuetsu Graphite Works Co., Ltd. (Osaka, Japan), and ABG grade available from Superior Graphite Co. (Chicago, Ill.). In yet other embodiments, the graphite particles can be synthetic, non-expanded graphite particles, for example, Timrex® KS4, KS6, KS15, MX15 available from Timcal, Ltd. (Bodio, Switzerland). The graphite particles can be oxidation-resistant synthetic, non-expanded graphite particles. The term "oxidation resistant graphite" as used herein refers to a synthetic graphite made from high purity carbon or carbonaceous materials having a highly crystalline structure. Suitable oxidation resistant graphites include, for example, SFG4, SFG6, SFG10, SR315 available from Timcal. Ltd., (Bodio, Switzerland). The use of oxidation resistant graphite in blends with another strongly oxidizing cathode active material, nickel oxyhydmxide, is disclosed in commonly assigned U.S. Ser. No. 11/820,781, filed Jun. 20, 2007. Carbon nanofibers are described, for example, in commonly-assigned U.S. Ser. No. 09/658,042, filed Sep. 7, 2000 and U.S. Ser. No. 09/829,709, filed Apr. 10, 2001. Cathode 12 can include between 3% and 35%, between 4% and 20%, between 5% and 10%, or between 6% and 8% by weight of conductive additive.

An optional binder can be added to cathode 12 to enhance structural integrity. Examples of binders include polymers such as polyethylene powders, polypropylene powders, polyacrylamides, and various fluorocarbon resins, for example polyvinylidene difluoride (PYDF) and polytetrafluoroethylene (PTFE). An example of a suitable polyethylene hinder is available from Dupont Polymer Powders (Sàrl, Switzerland) under the tradename. Coathylene HX1681. The cathode 12 can include, for example, from 0.05% to 5% or from 0.1% to 2% by weight binder relative to the total weight of the cathode. Cathode 12 can also include other optional additives.

The electrolyte solution also is dispersed throughout cathode 12, e.g., at about 5-7 percent by weight. Weight percentages provided above and below are determined after the electrolyte solution was dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 33 and about 45 percent by weight of the alkali metal hydroxide, such as about 9 N KOH (i.e., about 37% by weight KOH) In some embodiments, the electrolyte solution also can include up to, about 6 percent by weight zinc oxide, e.g., about 2 percent by weight zinc oxide.

Anode 14 can be formed of any of the zinc-based materials conventionally used in alkaline battery zinc anodes. For example, anode 14 can be a gelled zinc anode that includes zinc metal particles and/or zinc alloy particles, a gelling agent, and minor amounts of additives, such as a gassing inhibitor. A portion of the electrolyte solution can be dispersed throughout, the anode. The zinc particles can be any of the zinc-based particles conventionally used in gelled zinc anodes. The zinc-based particles can be formed of a zinc-based material, for example, zinc or a zinc alloy. Generally, a zinc-based particle formed of a zinc-alloy is greater than 75% zinc by weight, typically greater than 99.9% by weight zinc. The zinc alloy can include zinc (Zn) and at least one of the following elements: indium (In), bismuth (Bi), aluminum (Al), calcium (Ca), gallium (Ga), lithium (Li), magnesium (Mg), and tin (Sn). The zinc alloy typically is composed primarily of zinc and preferably can include metals that can inhibit gassing, such as indium, bismuth, aluminum and mixtures thereof. As used herein, gassing refers to the evolution of hydrogen gas resulting from a reaction of zinc metal or zinc alloy with the electrolyte. The presence of hydrogen gas inside a sealed battery is undesirable because a pressure buildup can cause leakage of electrolyte. Preferred zinc-based particles are both essentially mercury-free and lead-free. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The terms "zinc.", "zinc powder", or "zinc-based particle" as used in herein shall be understood to include zinc alloy powder having a high relative concentration of zinc and as such functions electrochemically essentially as pure zinc. The anode can include, for example, between about 60% and about 80%, between about 62% and 75%, between about 63% and about 72%, or between about 67% and about 71% by weight of zinc-based particles. For example, the anode can, include less than about 72%, about 70%, about is 68%, about 64%, or about 60%, by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a sieve of 200 mesh size (i.e., a sieve having a Tyler standard mesh size corresponding to a U.S. Standard sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small, enough to pass through a 325 mesh size sieve (i.e., a sieve having a Tyler standard mesh size corresponding to a U.S. Standard sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or mixtures of zinc fines and dust (e.g., from about 35 to about 75 weight percent) along with larger size (e.g., −20 to +200 mesh) zinc-based particles. A mixture of zinc-based particles can provide good overall performance with respect to rate capability of the anode for a broad spectrum of discharge rate requirements as well as provide good storage characteristics. To improve performance at high discharge rates after storage, a substantial percentage of zinc fines and/or zinc dust can, be included in the anode.

Anode 14 can include gelling agents, for example, a high molecular weight polymer that can provide a network to suspend the zinc particles in the electrolyte. Examples of gelling agents include polyacrylic acids, grafted starch materials, salts of polyacrylic acids, polyacrylates, carboxymethylcellulose, a salt of a carboxymethylcellulose (e.g., sodium carboxymethylcellulose) or combinations thereof. Examples of polyacrylic acids; include Carbopol 940 and 934 available from B. F. Goodrich Corp. and Polygel 4P available from 3V. An example of a grafted starch material is Waterlock A221 or A220 available from Grain Processing Corp. (Muscatine, Iowa). An example of a salt of a polyacrylic acid is Alcosorb GI available from Ciba Specialties. The anode can include, for example, between about 0.05% and 2% by weight, or between about 0.1% and 1% by weight of the gelling agent by weight.

Gassing inhibitors can include a metal, such as bismuth, tin, indium, aluminum or a mixture or alloys thereof. A gassing inhibitor also can include an inorganic compound, such as a metal salt, for example, an indium, or bismuth salt (e.g., indium sulfate, indium chloride, bismuth nitrate). Alternatively, gassing inhibitors can be organic compounds, such as phosphate esters, ionic surfactants or nonionic surfactants. Examples of ionic surfactants are disclosed in, for example, U.S. Pat. No, 4,777,100, which is hereby incorporated by reference.

Separator 16 can have any of the conventional designs for primary alkaline battery separators. In some embodiments, separator 16 can be formed of two layers of a non-woven, non-membrane material, with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Typically, the layers can be substantially devoid of fillers, such as inorganic particles. In some embodiments, the separator can include inorganic particles. In other embodiments, separator 16 can include a layer of cellophane combined with a layer of non-woven material. The separator optionally can include an additional layer of non-woven material. The cellophane layer can be adjacent to cathode 12. Preferably, the non-woven material can contain from about 78% to 82% by weight polyvinylaicohol (PVA) and from about 18% to 22% by weight rayon and a trace amount of surfactant. Such non-woven materials are available from PDM under the tradename. PA25. An example of a separator including a layer of cellophane laminated to one or more layers of a non-woven material is Duralam DT225 available from Duracell Inc, (Aarschot, Belgium).

In yet other embodiments, separator 16 can be an ion-selective separator. An ion-selective separator can include a microporous membrane with an ion-selective polymeric coating. In some cases, such as in rechargeable alkaline manganese dioxide cells, diffusion of soluble zincate ion, i.e., $[Zn(OH)_4]^{2-}$ from the anode to the cathode can interfere with the reduction and oxidation of manganese dioxide, thereby resulting in a loss of coulombic efficiency and ultimately in decreased cycle life. Separators that can selectively inhibit the passage of zincate ions, while allowing free passage of hydroxide ions are described in U.S. Pat. Nos. 5,798,180 and 5,910,366. An example of a separator includes a polymeric substrate having a wettable cellulose acetate-coated polypropylene microporous membrane e.g., Celgard® 3559, Celgare® 5550, Celgare® 2500, and the like) and an ion-selective coating applied to at least one surface of the substrate. Suitable ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. In addition to preventing migration of zincate ions to the manganese dioxide cathode, the selective separator was described in U.S. Pat. Nos. 5,798,180 and 5,910,366 as capable of diminishing diffusion of soluble ionic species away from the cathode during discharge Alternatively or in addition, the separator can prevent substantial diffusion of soluble transition metal species (e.g., $Ag^+$, $Ag^{2+}$, $Cu^+$, $Cu^{2+}$, $Bi^{5+}$, and/or $Bi^{3+}$) away from the cathode to the zinc anode, such as the separator described in U.S. Pat. No. 5,952,124. The separator can include a substrate membrane such as cellophane, nylon (e.g., Pellote® sold by Freundenburg, Inc.), microporous polypropylene (e.g., Celgard® 3559 sold by Celgard, Inc.) or a composite material including a dispersion of a carboxylic ion-exchange material in a microporous acrylic copolymer (e.g., PD2193 sold by Pall-RAI, Inc.). The separator can further include a polymeric coating thereon including a sulfonated polyaromatic ether, as described in U.S. Pat. Nos. 5,798,180; 5,910,366; and 5,952,124.

In other embodiments, separator 16 can include an adsorptive or trapping layer. Such a layer can include inorganic particles that can form an insoluble compound or an insoluble complex with soluble transition metal species to limit diffusion of the soluble transition metal species through the separator to the anode. The inorganic particles can include metal oxide nanoparticles, for example, as $ZrO_2$ and $TiO_2$. Although such an adsorptive separator can attenuate the concentration of the soluble transition metal species, it may become saturated and lose effectiveness when high concentrations of soluble bismuth species are adsorbed. An example of such an adsorptive separator is disclosed in commonly assigned U.S. Ser. No. 10/682,740, filed on Oct. 9, 2003.

Battery housing 18 can, be any conventional housing commonly used for primary alkaline batteries. The battery housing 18 can be fabricated from metal, for example, nickel-plated cold-rolled steel. The housing typically includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12 or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black or graphite particles. Such materials include LB1000 (Timcal, Ltd.), Eccocoat 257 (W. R. Grace & Co.), Electrodag 109 (Acheson Colloids, Colo.), Electrodag 112 (Acheson), and EB0005 (Acheson). Methods of applying the conductive layer are disclosed in, for example, Canadian Patent No. 1,263,697, which is hereby incorporated by reference.

The anode current collector 20 passes through seal 22 extending into anode 14. Current collector 20 is made from a suitable metal, such as brass or brass-plated steel. The upper end of current collector 20 electrically contacts the negative top cap 24. Seal 22 can be made, for example, of nylon.

Battery 10 can be assembled using conventional methods and hermetically sealed by a mechanical crimping process. In some embodiments, positive electrode 12 can be formed by a pack and drill method, described in U.S. Ser. No. 09/645,632, filed Aug. 24, 2000.

Battery 10 can be a primary electrochemical cell or in some embodiments, a secondary electrochemical cell, Primary batteries are meant to be discharged (e.g., to exhaustion) only once, and then discarded. In other words, primary batteries are not intended to be recharged, Primary batteries are described, for example, by D. Linden and T. B. Reddy (*Handbook of Batteries*, 3$^{rd}$ ed., New York: McGraw-Hill Co., Inc., 2002). In contrast, secondary batteries can be recharged for many times (e.g., more than fifty times, more than a hundred times, more than a thousand times). In some cases, secondary batteries can include relatively robust separators, such as those having many layers and/or that are relatively thick. Secondary batteries can also be designed to accommodate changes, such as swelling, that can occur in the batteries. Secondary batteries are described, for example, by T. R. Crompton (*Battery Reference Book*, 3$^{rd}$ ed., Oxford: Reed Educational and Professional Publishing, Ltd., 2000) and D. Linden, and T. B. Reddy (*Handbook of Batteries*, 3$^{rd}$ ed., New York: McGraw-Hill Co., Inc, 2002).

Battery 10 can have any of a number of different nominal discharge voltages (e.g., 1.2 V, 1.5 V, 1.65 V), and/or can be, for example, a AA, AAA, AAAA, C, or D battery. While battery 10 can be cylindrical in some embodiments, battery 10 can be non-cylindrical. For example, battery 10 can be a coin cell, a button cell, a wafer cell, or a racetrack-shaped cell. In some embodiments, a battery can be prismatic. In certain embodiments, a battery can have a rigid laminar cell configuration or a flexible pouch, envelope or bag cell configuration. In some embodiments, a battery can, have a spirally wound configuration, or a flat plate configuration, Batteries are described, for example, in U.S. Pat. No. 6,783,893; U.S. Patent Application Publication No. 2007/0248879 A1, filed on Jun. 20, 2007; and U.S. Pat. No. 7,435,395.

The following examples are illustrative and not intended, to be limiting.

Example 1

The β-NiOOH was obtained from Nanfu Chemicals (Fujian Nanping Nanfu Battery Co., Ltd., Nanping, Fujian, P. R. China). Precursor metal oxides $LiNi_{0.8}Co_{0.2}O_2$ and $LiNi_{0.8}Co_{0.15}Al_{0.05}O_2$ were obtained from Umex (Umex Inc., Fort Saskatchewan, Alberta, Canada) and Toda (TODA Material Corp. Kitakyushu-City, Fukuoka, Japan) respectively. The $LiCoO_2$ was obtained from FMC Corp. (Charlotte, N.C., USA).

A lithium nickel oxide ($LiNiO_2$) was prepared by heating a mixture containing a stoichiometric amount (i.e., 1:1 mole ratio) of $Ni(OH)_2$ and at 800° C. in an oxygen atmosphere for a period of about 48 hours. Delithiation (e.g., lithium extraction or leaching) of $LiNi_{0.8}Co_{0.2}O_2$, $LiNi_{0.8}Co_{0.15}Al_{0.05}O_2$, and $LiNiO_2$ were carried out by separately treating each active material with an aqueous 6M $H_2SO_4$ solution at 0-5° C. for 12 hours, isolating the solid product, washing the solid product with water, and drying at about 80° C. to generate the delithiated non-stoichiometric) metal oxides $Li_{1-x}H_yNi_{0.8}Co_{0.2}O_2$, $Li_{1-x}H_yNi_{0.8}Co_{0.15}Al_{0.05}O_2$, and $Li_{1-x}H_yNiO_2$. For each 100 g of precursor metal oxide to be delithiated, about 1 liter of 6M sulfuric acid was required. Washing was repeated several times, until the pH of the wash liquid was >5. The wash liquid was analyzed to determine the amount of soluble Li, and dissolved transition metals. The chemical composition of the dried solid product was determined by ICP-AE spectroscopy. The hydrogen concentration in the sample was determined by prompt gamma ray activation analysis (PGAA). The average oxidation state of the transition metals was determined indirectly from the specific capacity obtained when the non-stoichiometric metal oxide was included in a cathode and discharged at relative low rate against a Li metal anode in non-aqueous coin cell to a nominal cut-off voltage of 2.5V as described in Example 10 (vide infra) and shown in FIG. 17.

All the precursor metal oxides and the corresponding acid-treated delithiated products were characterized by scanning electron microscopy (e.g., primary particle size, particle morphology, and microstructure), and powder X-ray diffraction (e.g., phase composition and purity). In addition, physical properties such as true density, B.E.T. specific surface area, and average particle size and size distribution (i.e., secondary particles) were measured. Referring to FIGS. 6A and 6B, SEM images for the precursor $LiNiO_2$ and the corresponding delithiated $Li_{1-x}H_yNiO_2$, respectively, are shown.

Selected physical and chemical properties of β-NiOOH, $LiCoO_2$, delithiated $LiCoO_2$, $LiNiO_2$ and delithiated $LiNiO_2$ (DLNO-1a) are given in Table 2, including elemental analysis, and calculated compositions for the delithiated products.

a mortar and pestle. Cathode disks weighing nominally 0.425 g were pressed directly onto a fine nickel wire grid welded to the bottom of the cathode cans using an applied pressure of about 2000 lbs. A separator disk (e.g., Duralam DT225 from Duracell, Aarshot, Belgium) including a layer of cellophane laminated onto a non-woven layer was wetted with electrolyte solution and placed on top of the cathode disk. A plastic seal was positioned on the anode can and 2.6

TABLE 2

Physical and chemical properties of delithiated non-stoichiometric metal oxides and corresponding precursor metal oxides

| Properties | β-NiOOH (uncoated) | $LiCoO_2$ (precursor) | Delithiated $LiCoO_2$ | $LiNiO_2$ (precursor) | Delithiated $LiNiO_2$ (dried at 80° C.) |
|---|---|---|---|---|---|
| True density, (g/cc) | 4.09 | 4.95 | 4.31 | 4.81 | 4.70 |
| BET SSA ($m^2/g$) | 13.13 | 2.83 | 1.87 | 2.10 | 1.36 |
| Ave. particle size, $D_{50}$ (μm) | 11.33 | 15.11 | 1.69 | 14.38 | 3.20 |
| Wt % Metal (Co or Ni) (ICP) | 64.00 | 60.20 | 63.90 | 60.10 | 64.03 |
| Wt % Li (ICP) | N/A | 7.08 | 1.09 | 7.18 | 0.87 |
| Wt % H (PGAA) | — | ~0.02 | ~0.25 | ~0.02 | ~0.20 |
| Calc'd chemical composition | NiOOH | $LiCoO_2$ | $Li_{0.15}H_{0.25}CoO_2$ | $LiNiO_2$ | $Li_{0.11}H_{0.2}NiO_2$ |

Electrochemical performance of electrodes including $LiNiO_2$, delithiated $LiNiO_2$, and β-NiOOH was evaluated in a three electrode flooded cell, filled with 9N KOH electrolyte with a Hg/HgO reference electrode and a platinum wire as the counter electrode. The test electrode was prepared by pressing (e.g., 1 metric ton/$cm^2$) of a 1:1 (by weight) teflonized acetylene black/active cathode mix onto a nickel X-met grid current collector. To enhance wetting by the electrolyte, the electrode was filled with electrolyte under vacuum, Electrochemical measurements were performed using a 273A EG&G Princeton Applied Research potentiostat.

Figure 8:
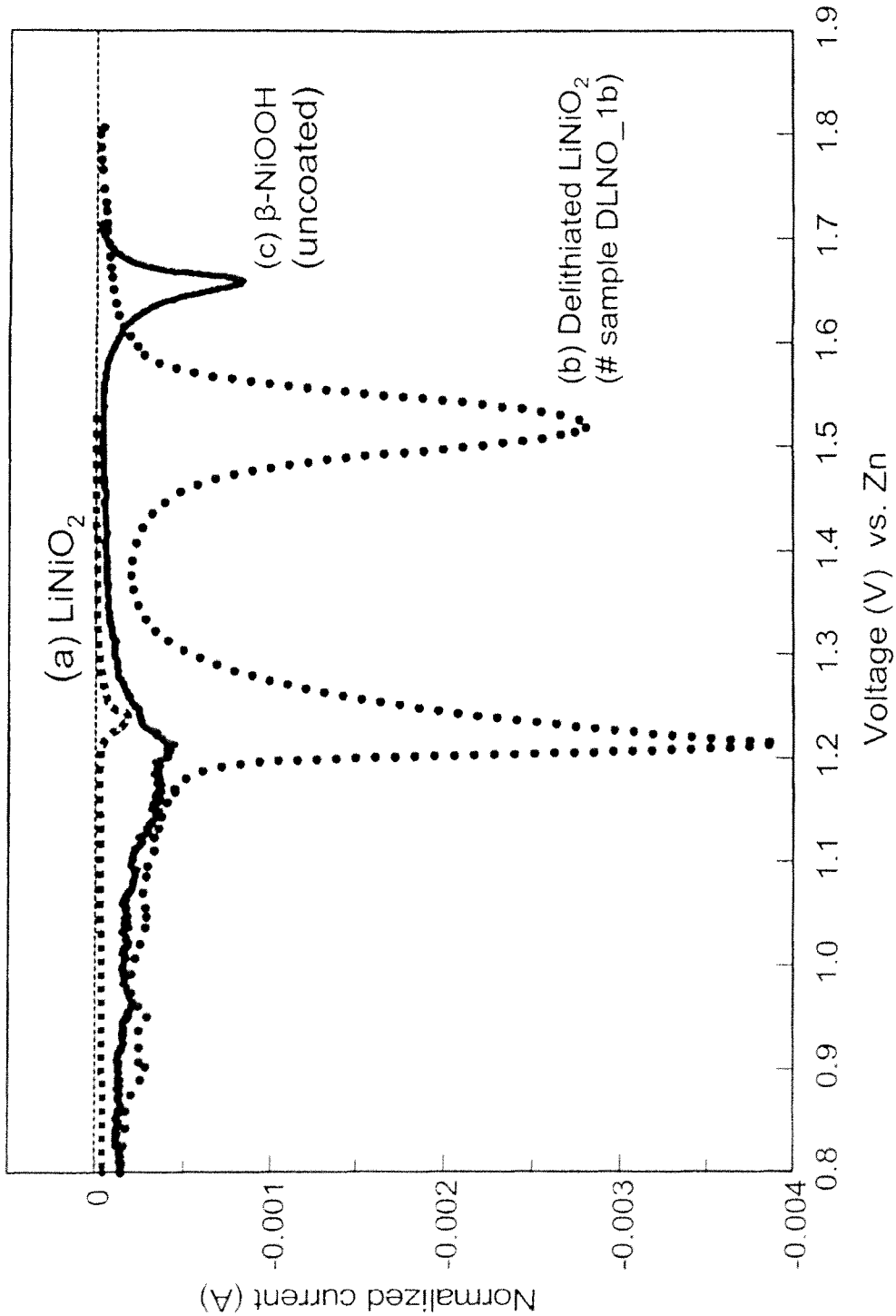
FIG. 8 is a graph showing a potentiodynamic scan at a sweep rate of 0.01 mV/s of cathode materials (a) $LiNiO_2$ (b) delithiated $LiNiO_2$, and (c) β-NiOOH in three electrode glass cells containing 9N KOH electrolyte.

Referring to FIG. 8, plots of potentiodynamic scans performed at a sweep rate of 0.01 mV/sec are depicted for test electrodes including (a) $LiNiO_2$, (b) delithiated and (c) β-NiOOH. All voltage values were converted to values corresponding to a Zn/ZnO reference. The peaks in curves (b) and (c) indicate that the voltages for the two characteristic electrochemical reduction peaks of β-NiOOH and the delithiated LiNia, are very different. The discharge performance of the transition, metal oxides also was evaluated in alkaline button cells.

Example 2

Figure 9:
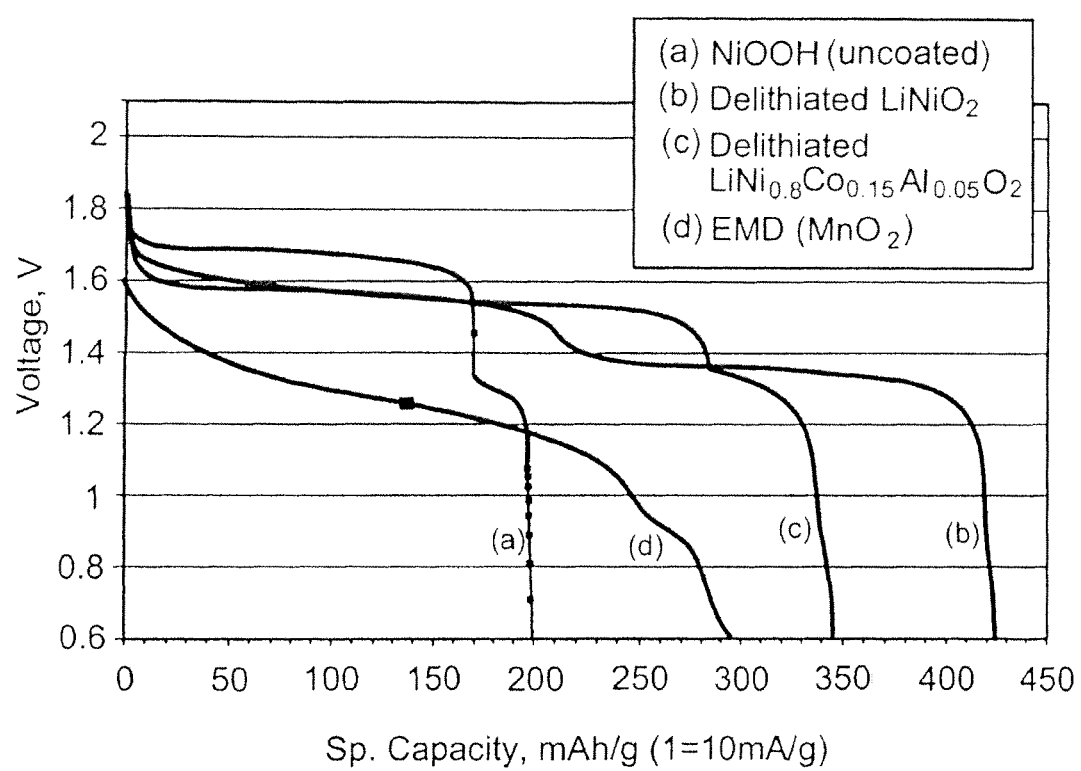
FIG. 9 is a graph showing discharge performance for batteries with cathodes including (a) β-NiOOH (uncoated), (b) delithiated $LiNiO_2$, (c) delithiated $LiNi_{0.8}Co_{0.15}Al_{0.05}O_2$ and (d) commercial EMD.

Referring to FIG. 9, discharge curves for button cells with cathodes including (a) β-NiOOH (uncoated) of Example 1, (b) acid-treated delithiated $LiNiO_2$ of Example 1 (DLNO-1a), (c) acid-treated delithiated $LiNi_{0.8}Co_{0.15}Al_{0.05}O_2$ from Example 1 (DLNCAO-80), and (d) commercial EMD, with a Zn anode are depicted. Cathode mixtures were prepared by blending about 0.32 g (75 weight percent) of the cathode active material (e.g., delithiated $LiNiO_2$, delithiated $LiNi_{0.8}Co_{0.15}Al_{0.05}O_2$, or NiOOH) with 0.085 g (20 weight percent) of natural graphite, for example NdG-15 or MP-0702X (Nacional de Grafite, itapecirica, Brazil) and 0.02 g (5 weight percent) of an electrolyte solution containing 38 weight percent KOH and 2 weight percent ZnO using g of gelled zinc slurry containing 68% weight percent zinc alloy particles, 31% weight percent electrolyte solution, and about 0.5% weight percent gelling agent was added to the can. The cell was closed and hermetically sealed by crimping. Multiple button, cells were fabricated for each cathode active material. Cells were typically stored for 24 hours at room temperature before discharging to ensure complete wetting of the cathode and separator by the electrolyte.

Referring to FIG. 9, discharge curves for cells with cathodes including delithiated $LiNiO_{0.8}Co_{0.15}Al_{0.05}O_2$, delithiated $LiNiO_2$ or β-NiOOH are depicted with average specific gravimetric capacities of 345 mAh/g, 425 mAh/g, and 200 mAh/g, respectively, when discharged at relative low rates (e.g., 10 mA/g active) to a 0.8 V cutoff voltage. The average gravimetric capacities are also included in Table 3. Comparable cells with cathodes including a commercial EMD discharged under the same discharge conditions had a specific capacity of about 287 mAh/g.

TABLE 3

Gravimetric specific capacities for delithiated non-stoichiometric metal oxides

| Sample description (Sample no.) | Curve in FIG. 9 | Precursor metal oxide/Source | Capacity to 0.8 V I = 10 mA/g (mAh/g) |
|---|---|---|---|
| β-NiOOH, uncoated | (a) | NiOOH/Nanfu | 200 |
| Delithiated $LiNiO_2$ (DLNO-1a) | (b) | $LiNiO_2$/Example 1 | 425 |
| Delithiated $LiNi_{0.8}Co_{0.15}Al_{0.05}O_2$ (DLNCAO-80) | (c) | $LiNi_{0.8}Co_{0.15}Al_{0.05}O_2$/ NEI Corp. | 287 |
| EMD | (d) | EMD/Tronox | 287 |

Example 3

The effect of partial cobalt substitution for Ni in $LiNiO_2$, on the discharge performance in button cells was determined. The precursor nickel oxides $LiNiO_2$, $Li(Ni_{0.9}Co_{0.10})O_2$ and $Li(Ni_{0.8}Co_{0.20})O_2$ were obtained from a commercial source (e.g., NEI Corp.) and were delithiated by the general method of Example 1. Button cells were fabricated by the method of Example 2. The discharge performance of cells with cathodes including del ithiated $LiNiO_2$ (DLNO-1c), delithiated $Li(Ni_{0.9}Co_{0.10})O_2$ (DLNO-90), and delithiated $Li(Ni_{0.8}Co_{0.20})O_2$(DLNO-80) was evaluated.

Figure 10:
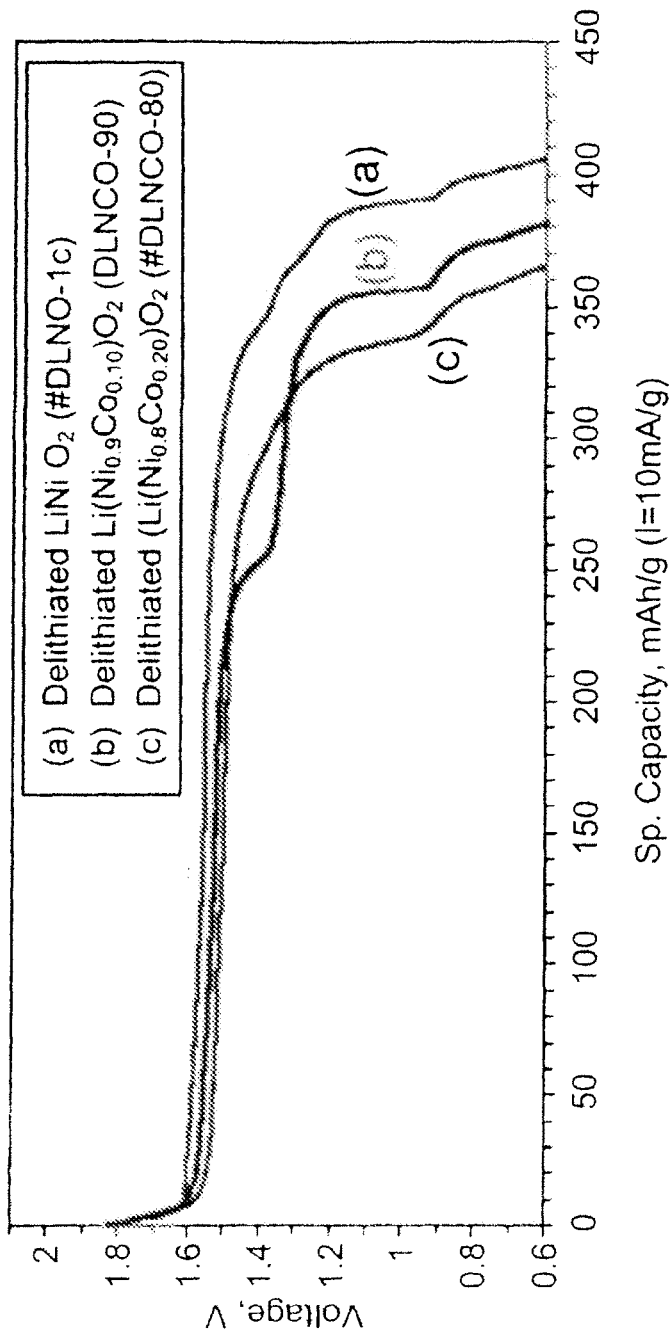
FIG. 10 is a graph showing discharge performance for batteries with cathodes including embodiments of cathode active materials.

Discharge curves for the cells of Example 3 are depicted in FIG. 10 and the corresponding specific gravimetric capacities are given in Table 4. Cells with cathodes including delithiated delithiated $LiNiO_2$, and delithiated $LiNi_{0.8}Co_{0.2}O_2$ provided average capacities of 400 mAh/g, 375 mAh/g and 355 mAh/g, respectively, when discharged at a relative low rate (e.g., 10 mA/g active) to a 0.8 V cutoff voltage. Under the same discharge conditions, comparable cells with cathodes including EMD and β-NiOOH provided average capacities of 275 mAh/g and 200 mAh/g, respectively. For cells with cathodes including delithiated mixed metal oxides prepared from precursor mixed metal oxides in which nickel was partially substituted by cobalt (e.g., $LiNi_{0.9}Co_{0.1}O_2$ and $LiNi_{0.8}Co_{0.2}O_2$), both specific capacity and average discharge voltage decreased as the cobalt content increased. For example, the capacity of cells with cathodes including delithiated $Li(Ni_{0.9}Co_{0.1})O_2$ was about 94% of that of cells including delithiated $LiNiO_2$ and the capacity of cells including delithiated $Li(Ni_{0.8}Co_{0.2})O_2$ was about 89% of that of cells including delithiated

TABLE 4

Gravimetric specific capacities of delithiated non-stoichiometric mixed metal oxides.

| Sample description (Sample no.) | Curve in FIG. 10 | Precursor metal oxide/Source | Capacity to 0.8 V I = 10 mA/g (mAh/g) |
|---|---|---|---|
| Delithiated $LiNiO_2$ (DLNO-1c) | (a) | $LiNiO_2$/NEI Corp. | 400 |
| Delithiated $Li(Ni_{0.9}Co_{0.10})O_2$ (DLNO-90) | (b) | $Li(Ni_{0.9}Co_{0.1})O_2$/ NEI Corp. | 375 |
| Delithiated $Li(Ni_{0.8}Co_{0.20})O_2$ (DLNO-80) | (c) | $Li(Ni_{0.8}Co_{0.2})O_2$/ NEI Corp. | 355 |

Example 4

The effect of partial cobalt and manganese substitution for nickel in the precursor metal oxide $LiNiO_2$ on the discharge performance of cells with cathodes including the corresponding delithiated metal oxides was determined.

The precursor $LiNiO_2$ and corresponding delithiated $LiNiO_2$ were prepared by the methods of Example 1. A precursor $LiCoO_2$ was prepared by reacting a stoichionletric mixture (i.e., a 1:1 mole ratio) of $Co(OH)_2$ and LiOH at 800° C. for 48 hours in an oxygen atmosphere. The precursor $LiCoO_2$ was delithiated by the acid-treatment method of Example 1. The commercial Mn and/or Co-substituted precursor metal oxides $Li(Ni_{0.5}Mn_{0.5})O_2$ obtained from Tanaka Chemical and $Li(Ni_{0.33}Mn_{0.33}Co_{0.33})O_2$ obtained from 3M also were delithiated by the general method of Example 1.

Figure 11:
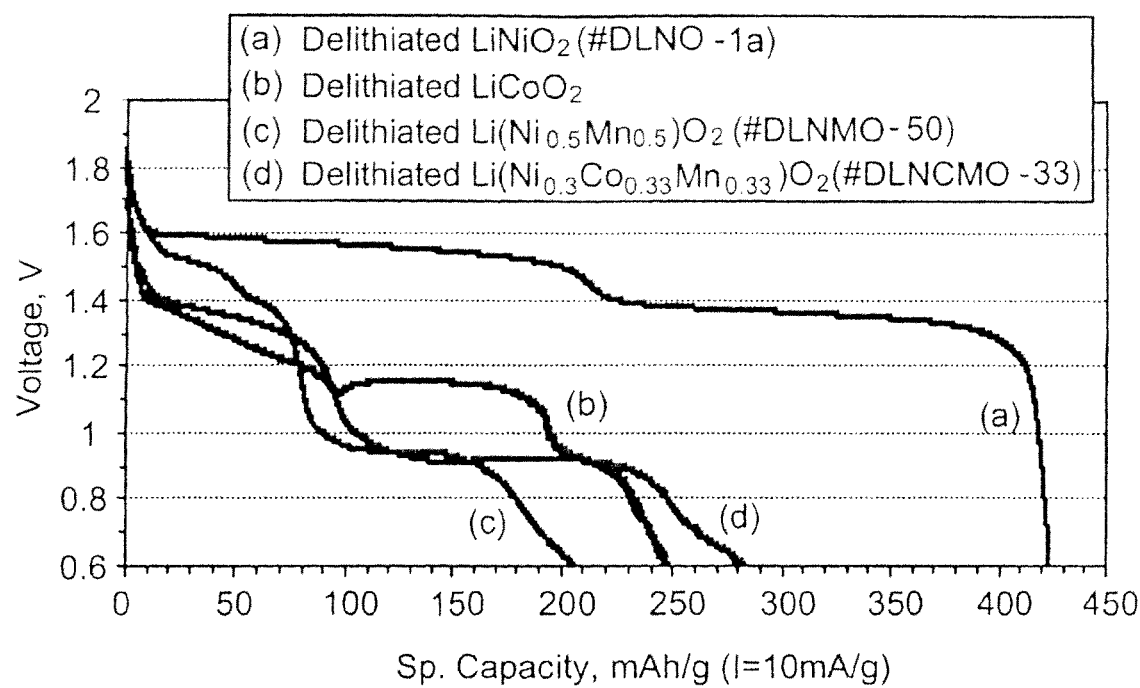
FIG. 11 is a graph showing discharge performance for batteries with cathodes including embodiments of cathode active materials.

The discharge performance of the delithiated metal oxides was evaluated in alkaline button cells fabricated by the method of Example 2. Referring to FIG. 11 discharge curves for cells with cathodes including (a) delithiated $LiNiO_2$ (DLNO-1a), (b) delithiated $LiCoO_2$ (DLCO-1) (c) delithiated $Li(Ni_{0.5}Mn_{0.5})O_2$ (DLNMO-50), and (d) delithiated $Li(Ni_{0.33}Mn_{0.33}Co_{0.33})O_2$ (DLNCMO-33) are depicted. The cells were discharged at a relative low rate (e.g, 10 mA/g active) to a 0.8 v cutoff voltage. The discharge voltage profiles for cells with cathodes including the delithiated $LiCoO_2$ had at least two discrete plateaus that can be attributed to reduction of $Co^{4+}$ to $Co^{3+}$ and $Co^{3+}$ to $Co^{2+}$. The average discharge capacities are given in Table 5.

The discharge capacities of the cells with cathodes including Mn and/or Co-substituted delithiated mixed metal oxides were all less than that of cells containing the unsubstituted delithiated $LiNiO_2$. For example, the capacities of cells including the delithiated metal oxides containing cobalt were comparable, but only about 56% of the capacity of the delithiated $LiNiO_2$. Also, the capacities of cells with cathodes including the delithiated mixed metal oxides containing manganese decreased relative to that of cells contain in delithiated $LiNiO_2$ for increasing manganese substitution levels.

TABLE 5

Gravimetric specific capacities of delithiated non-stoichiometric mixed metal oxides.

| Sample description (Sample no.) | Curve in FIG. 11 | Precursor/Source | Capacity to 0.8 V I = 10 mA/g (mAh/g) |
|---|---|---|---|
| Delithiated $LiNiO_2$ (DLNO-1a) | (a) | $LiNiO_2$/Example 1 | 425 |
| Delithiated $LiCoO_2$ (DLCO-1) | (b) | $LiCoO_2$/Example 4 | 230 |
| Delithiated $Li(Ni_{0.5}Mn_{0.5})O_2$ (DLNMO-50) | (c) | $Li(Ni_{0.5}Mn_{0.5})O_2$/ Tanaka Chemical | 180 |
| Delithiated $Li(Ni_{0.33}Co_{0.33}Mn_{0.33})O_2$ (DLNCMO-33) | (d) | $Li(Ni_{0.33}Co_{0.33}Mn_{0.33})O_2$/ 3M (Tanaka, Nichia) | 250 |

Example 5

Figure 4:
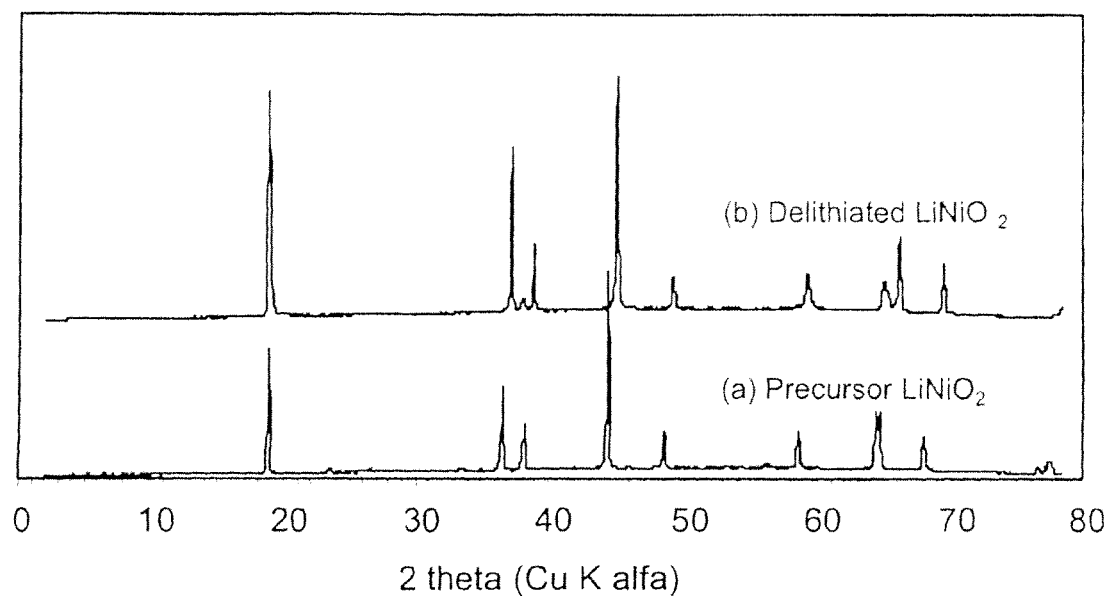
FIG. 4 shows powder X-ray diffraction patterns of an embodiment of (a) a precursor metal oxide $LiNiO_2$ prepared at 800° C. in oxygen for 48 h; and (b) the corresponding non-stoichiometric metal oxide obtained by delithiation (de-lithiated nickel oxide)
Figure 5:
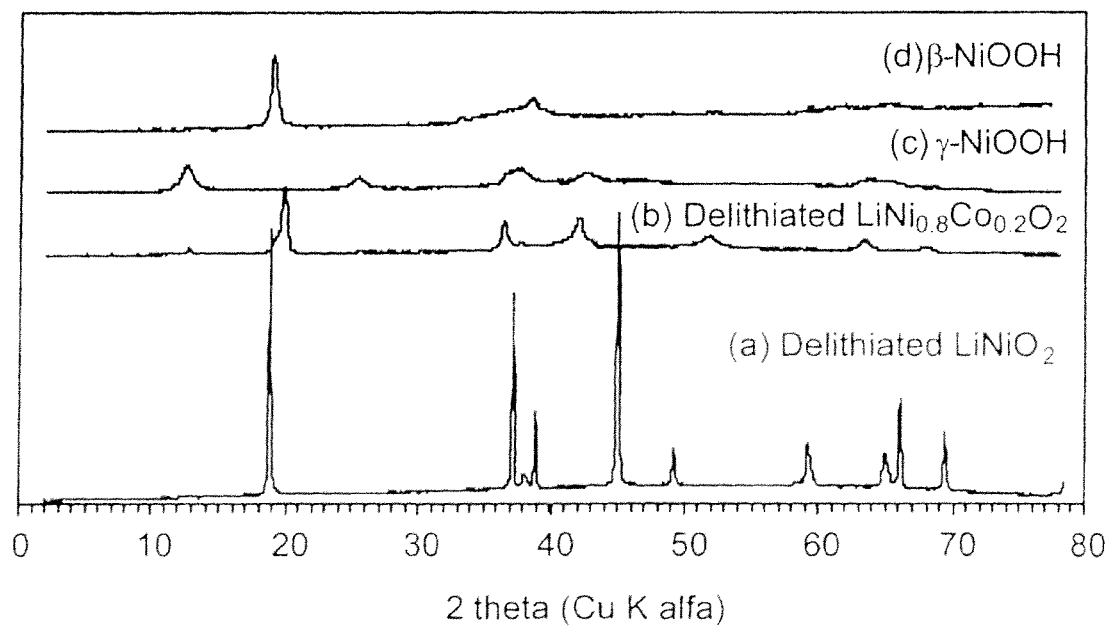
FIG. 5 shows powder X-ray diffraction patterns of (a) a delithiated lithium nickel oxide; (b) delithiated $LiNi_{0.8}Co_{0.02}O_2$; (c) γ-NiOOH; and (d) β-NiOOH.

The effect of drying temperature after delithiation on the discharge performance of cells with cathodes including the delithiated $LiNiO_2$ was determined. The powder XRD patterns for a delithiated $LiNiO_2$ (DLNO-1a) prepared by the method of Example 1 that had been dried at 60-80° C. for 12 hours in air and a delithiated $LiNiO_2$ heated at 150° C. for 12 hours in oxygen after delithiation were obtained and compared. Referring to FIG. 7, the powder XRD pattern of the delithiated $LiNiO_2$ heated at 150° C. in oxygen for 12 hours had a diffraction pattern that differed from that of the delithiated $LiNiO_2$ that had been dried at 60-80° C. in air shown in FIG. 5 as curve (a). Referring to FIG. 4, the positions of the diffraction peaks in the powder XRD patterns of the precursor $LiNiO_2$ and the delithiated $LiNO_2$ were nearly identical, indicating that the interlayer spacing changed little on delithiation of the precursor $LiNiO_2$. The diffraction pattern of the delithiated $LiNiO_2$ that had been heated at 150° C. was consistent with that of a reference pattern for a spinel type $LiNi_2O_4$ (e.g., Powder Diffraction File #41-0890, available from International Center for Diffraction Data, Newton Square, Pa.).

Figure 12:
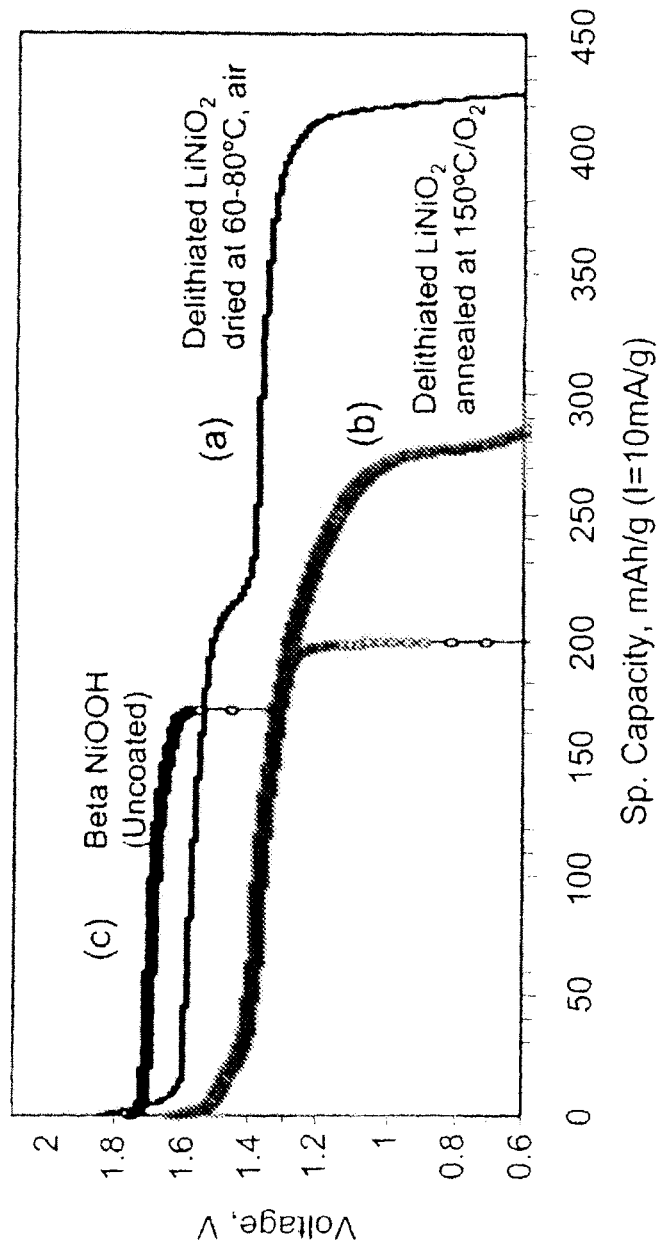
FIG. 12 is a graph showing discharge performance for batteries with cathodes including embodiments of cathode active materials.

The discharge performance of the delithiated metal oxides was evaluated in alkaline button cells fabricated by the method of Example 2. Referring to FIG. 12, discharge curves for cells with cathodes including (a) delithiated $LiNiO_2$ dried at 60-80° C. in air (DLNO-1a) (b) delithiated $LiNiO_2$ heated at 150° C. in oxygen (DLNO-spinel), and (c) uncoated β-NiOOH are depicted. The specific capacities for the cells containing the delithiated $LiNiO_2$ heated at 150° C. corresponded to a reduction of ~0.8 electron/Ni, less than expected for spinel-type $LiNi_2O_4$ containing $Ni^{++}$ and $Ni^{3+}$ in an atom ratio of 1:1 and Ni with an average oxidation state of +3.5. Further, cells with cathodes including the delithiated $LiNiO_2$ heated at 150° C. had discharge capacity about 40% greater than that of cells containing β-NiOOH and corresponding to about 66% of the capacity of cells containing the delithiated $LiNiO_2$ dried at 60-80° C.

The specific capacity of the cells decreased as the drying/heating temperature after delithiation was increased for the delithiated $LiNiO_2$, consistent with a decrease in the amount of Ni having an average oxidation state >3+ and consistent with the presence of a spinel-type phase.

TABLE 6

Gravimetric specific capacities of delithiated $LiNiO_2$ heated under different conditions.

| Sample description (Sample no.) | Curve in FIG. 12 | Precursor/ Source | Drying conditions | Capacity to 0.8 V I = 10 mA/g (mAh/g) |
|---|---|---|---|---|
| Delithiated $LiNiO_2$ (DLNO-1a) | (a) | $LiNiO_2$/ Example 1 | 80° C., 12 hours, air | 425 |
| Delithiated $LiNiO_2$ (DLNO, spinel-type) | (b) | $LiNiO_2$/ Example 1 | 150° C., 12 hours, $O_2$ | 280 |
| β-NiOOH, uncoated | (c) | NiOOH/ Nanfu | None | 200 |

Example 6

The effect of heating temperature and time during the synthesis of precursor $LiNiO_2$ on the discharge capacity and voltage profile of alkaline button cells with cathodes including the delithiated $LiNiO_2$ was determined.

Figure 13:
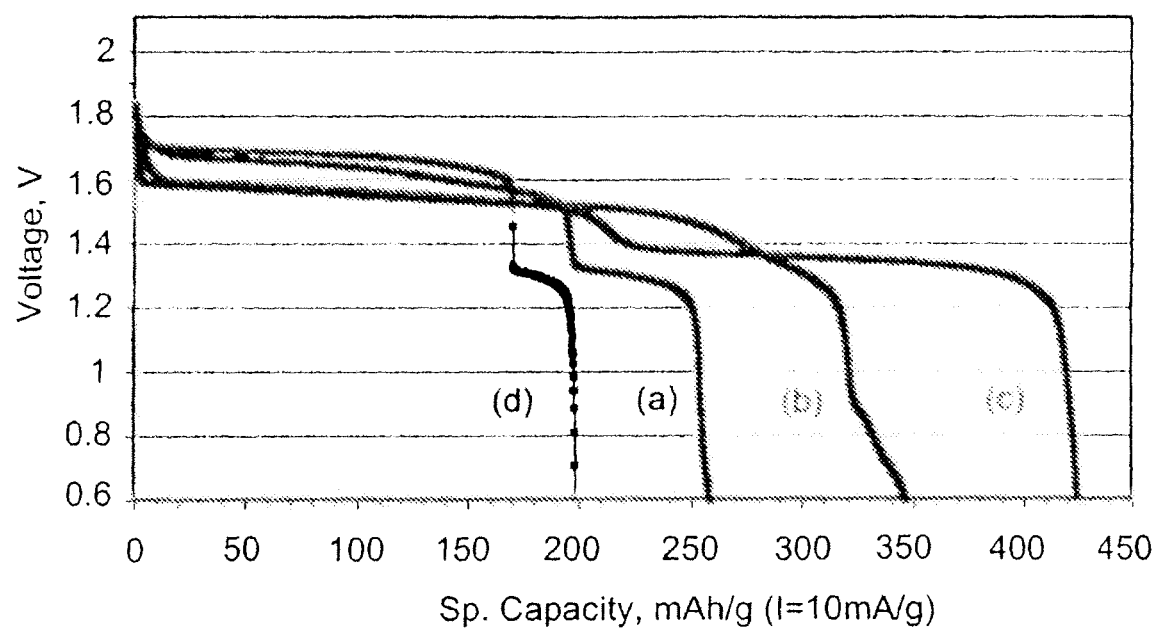
FIG. 13 is a graph showing discharge performance for batteries with cathodes including embodiments of cathode active materials.

Three precursor $LiNiO_2$ samples were prepared by heating separately three samples from a mixture containing a stoichiometric ratio of uncoated β-NiOOH and LiOH (i.e., 1:1 mole ratio) at different temperatures, for example, 500° C. 750° C., and 800° C., for different times and under different oxygen partial pressures. Three samples of delithiated $LiNiO_2$ were prepared from precursor $LiNiO_2$, samples synthesized at (a) 500° C. (DLNO-3), (b) 750° C. (DLNO-2), and (c) 800° C. (DLNO-1b), by the general method of Example 1. The discharge performance of the delithiated $LiNiO_2$ samples was evaluated in alkaline button cells fabricated by the method of Example 2. The cells were discharged at a relative low rate (e.g., 10 mA/g) to a 0.8 V cutoff voltage. Referring to FIG. 13, as the synthesis heating temperature was increased, the voltage profile progressively transformed from that of the NiOOH starting material depicted as curve (d) to that of the delithiated $LiNiO_2$ of Example 1 depicted as curve (c). Further, the specific capacities of cells with cathodes including the delithiated $LiNiO_2$ samples clearly increased with an increasing synthesis heating temperature of up to 800° C.

TABLE 7

Gravimetric specific capacities of delithiated $LiNiO_2$ prepared from precursor $LiNiO_2$ under different heating conditions.

| Sample description (Sample no.) | Curve in FIG. 13 | Precursor $LiNiO_2$ heating conditions | Capacity to 0.8 V I = 10 mA/g (mAh/g) |
|---|---|---|---|
| Delithiated $LiNiO_2$ (DLNO-3) | (a) | 500° C., 12 h, in air | 260 |
| Delithiated $LiNiO_2$ (DLNO-2) | (b) | 750° C., 24 h, in $O_2$ | 330 |
| Delithiated $LiNiO_2$ (DLNO-1b) | (c) | 800° C., 48 h, in $O_2$ | 425 |
| β-NiOOH, uncoated | (d) | N/A | 200 |

Example 7

Precursor $LiNiO_2$ was prepared by the method of Example 1. Precursor $LiNi_{0.8}Co_{0.2}O_2$ was obtained from a commercial source (e.g., NEI Corp.) as was the uncoated β-NiOOH (e.g., Nanfu Battery Co.). The precursor $LiNO_2$ and $LiNi_{0.8}Co_{0.2}O_2$ were delithiated using the method of Example 1. Dry blends of the delithiated metal oxides or the uncoated β-NiOOH and a commercial EMD (e.g., Tronox, AB) were prepared by mechanical mixing. All, blends contained 60% by weight EMD and 40% by weight of delithiated $LiNiO_2$, delithiated $LiNi_{0.8}Co_{0.2}O_2$ or β-NiOOH, denoted as samples DLNO/EMD, DLNCO/EMD, and NiOOH/EMD, respectively. Alkaline button cells with cathodes including the blends of the delithiated metal oxides or γ-NiOOH and EMD were fabricated as in Example 2.

Figure 14:
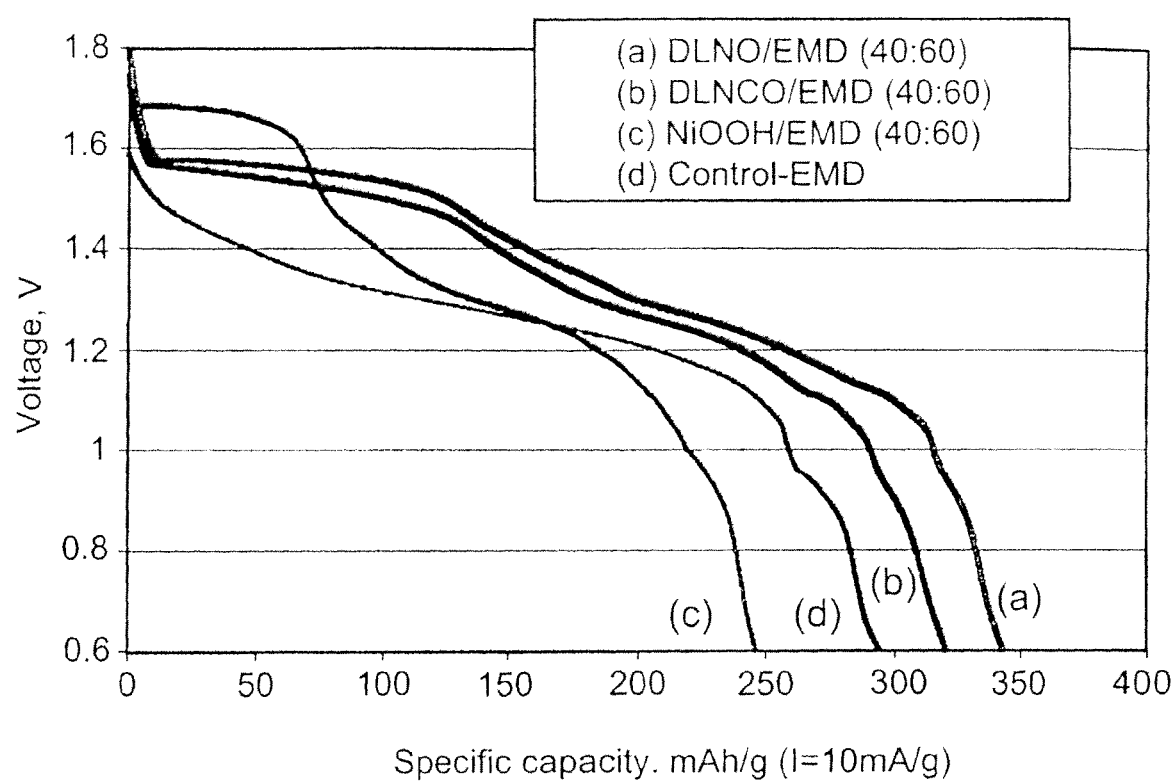
FIG. 14 is a graph showing discharge performance for batteries with cathodes including blends of embodiments of cathode active materials.

Referring to FIG. 14, discharge curves for cells with cathodes including 60:40 weight ratio blends of EMD and (a) delithiated (DLNO/EMD), (b) delithiated $LiNi_{0.8}Co_{0.2}O_2$ (DLNCO-80/EMD). (c) β-NiOOH are shown. Also referring to FIG. 14, curve (d) corresponds to cells with cathodes including EMD as the only active material. The capacities of cells with cathodes including blends of the nonstoichiometric transition metal oxides or β-NiOOH and EMD all discharged at a relative low rate (e.g., 10 mA/g active) to a 0.8 V cutoff voltage are summarized in Table 8. Discharge capacities for cells with cathodes including EMD, β-NiOOH, delithiated delithiated LiNi$_{0.8}$Co$_{0.2}$O$_2$ as the only active material are included in Table 8 for comparison.

TABLE 8

Gravimetric specific capacities of blends of delithiated non-stoichiometric metal oxides or β-NiOOH and EMD.

| Sample description (Sample no.) | Wt. ratio of EMD to delithiated metal oxide | Curve in FIG. 14 | Precursor metal oxide/source | Capacity to 0.8 V I = 10 mA/g (mAh/g) |
|---|---|---|---|---|
| Blend of EMD/delithiated LiNiO$_2$ (DLNO/EMD) | 60:40 | (a) | LiNiO$_2$/ Example 1 | 330 |
| Blend of EMD/delithiated LiNi$_{0.8}$Co$_{0.2}$O$_2$ (DLNCO-80/EMD) | 60:40 | (b) | LiNi$_{0.8}$Co$_{0.2}$O$_2$/ NEI Corp. | 310 |
| Blend of EMD/β-NiOOH/ EMD | 60:40 1:1 | (c) (d) | β-NiOOH/Nanfu EMD/Tronox | 240 287 |
| Delithiated LiNiO$_2$ (DLNO-1a) | N/A | N/A | LiNiO$_2$/ Example 1 | 425 |
| Delithiated LiNi$_{0.8}$Co$_{0.2}$O$_2$ (DLNCO-80) | N/A | N/A | LiNi$_{0.8}$Co$_{0.2}$O$_2$/ NEI Corp. | 355 |
| β-NiOOH, uncoated | N/A | N/A | β-NiOOH/Nanfu | 200 |

Referring to FIG. 14, cells with cathodes including blends of delithiated LiNiO$_2$ and EMD, delithiated LiNi$_{0.8}$Co$_{0.2}$O$_2$ and EMD, uncoated β-NiOOH and EMD or EMD had average specific gravimetric capacities of 330, 310, 240, and 287 mAh/g, respectively, at a at of 10 mA currentig of the active to a 0.8V cut-off voltage. The average capacities of cells containing blends of the delithiated metal oxides and EMD were somewhat less than that of cells containing the delithiated metal oxides alone, but greater than that of cells containing FMD alone. For example, the capacity of cells containing a 60:40 blend of EMD and delithiated LiNiO$_2$ was about 80% of that for cells containing delithiated LiNiO$_2$ alone. In the case of a 60:40 blend of EMD and delithiated LiNi$_{0.8}$Co$_{0.2}$O$_2$, the capacity of cells containing the blend was nearly 90% of that, for cells containing only LiNi$_{0.8}$Co$_{0.2}$O$_2$. Also, the capacities of cells containing the blends exceeded that of cells containing only EMD by 10 to 15%. Referring to FIG. 14, the cells with cathodes including blends of delithiated LiNiO$_2$ or delithiated LiNi$_{0.8}$Co$_{0.2}$O$_2$ and EMD had consistently higher running voltages than the cells containing only MD.

Example 8

The discharge performance of cells with cathodes including composites of delithiated LiNiO$_2$ and acid-treated EMD was evaluated. The composites were prepared by a one-step acid treatment of dry blends of the precursor LiNiO$_2$ and EMD mixed in various weight ratios. Discharge capacities of button cells with cathodes containing the composites were compared to that of cells with cathodes including a blend of separately delithiated LiNiO$_2$ and an acid-treated EMD or EMD. The discharge performance of cells containing the blends and composites of delithiated LiNiO$_2$ and acid-treated EMD were compared to that of cells containing only a commercial EMD (i.e., Example 8a) or uncoated β-NiOOH (i.e., Example 8b) as the active cathode material.

Cotnposites containing 13% by weight delithiated. LiNiO$_2$ and 87% by weight acid-treated EMD were prepared by dry blending the required amounts of the precursor LiNiO$_2$ and commercial EMD to form a blend having the desired final weight ratio of delithiated LiNiO$_2$ to acid-treated EMD, adding the blend to a 6M H$_2$SO$_4$ aqueous solution (100 g blend per 1.5 L, acid solution) to form a slurry, and stirring the slurry for about 20 hours at between 0 and 5° C. The solids in the slurry were allowed to settle. The clear supernatant solution, containing both Ni$^{2+}$ and Mn$^{2+}$ ions was removed, for example, by decantation. The resulting solid product was washed repeatedly with deionized water until the washings neutral pH (e.g., pH 5-7). The solid product was collected (e.g., by filtration) and dried in an oven in air at 80° C. for about 20 hours.

A delithiated nickel oxide LiNiO$_2$ (Example 8d-1) was prepared by a procedum similar to that of Example 1 with several minor changes. Specifically, the precursor LiNiO$_2$ was synthesized by blending uncoated β-NiOOH and LiOH.H$_2$O and heating the mixture to 280° C., in an O$_2$ atmosphere for 20 hours. The mixture was allowed to cool to ambient temperature and was re-blended and heated to 800° C. in an O$_2$ atmosphere for 48 hours. The formed precursor LiNiO$_2$ was delithiated by treatment with an aqueous solution of 6M H$_2$SO$_4$ at 0-5° C., for 12 hours, followed by washing with water and drying at 80° C. as in Example 1. The wash solution was analyzed for dissolved Li$^+$ and Ni$^{2+}$ ions. The chemical composition was determined by elemental analysis of the dried delithiated LiNiO$_2$ product. The hydrogen concentration was determined by prompt gamma-ray activation analysis (PGAA). The formula of the delithiated LiNiO$_2$ (Example 8d-1) was calculated as Li$_{0.3}$H$_{0.2}$NiO$_2$. The average nickel oxidation state was indirectly determined from the specific capacity obtained when the delithiated LiNiO$_2$ (Example 8d-1) was discharged against a Li metal anode in a non-aqueous coin cell at a relative low rate to a 2.5V cutoff voltage as described in Example 10 (vide infra).

Mechanical blends of the delithiated LiNiO$_2$ (Example 8d-1) and either an acid-treated EMD or EMD were prepared by dry mixing the corresponding powders in the required weight ratios. For example, a blend containing 25% by weight delithiated (Example 8d-1) and 75% by weight commercial EMD was prepared as Example 8d. Similarly, another blend containing 25% by weight delithiated LiNiO$_2$ (Example 8d-1) and 75% by weight acid-treated EMD was prepared as Example 8e.

Figure 15:
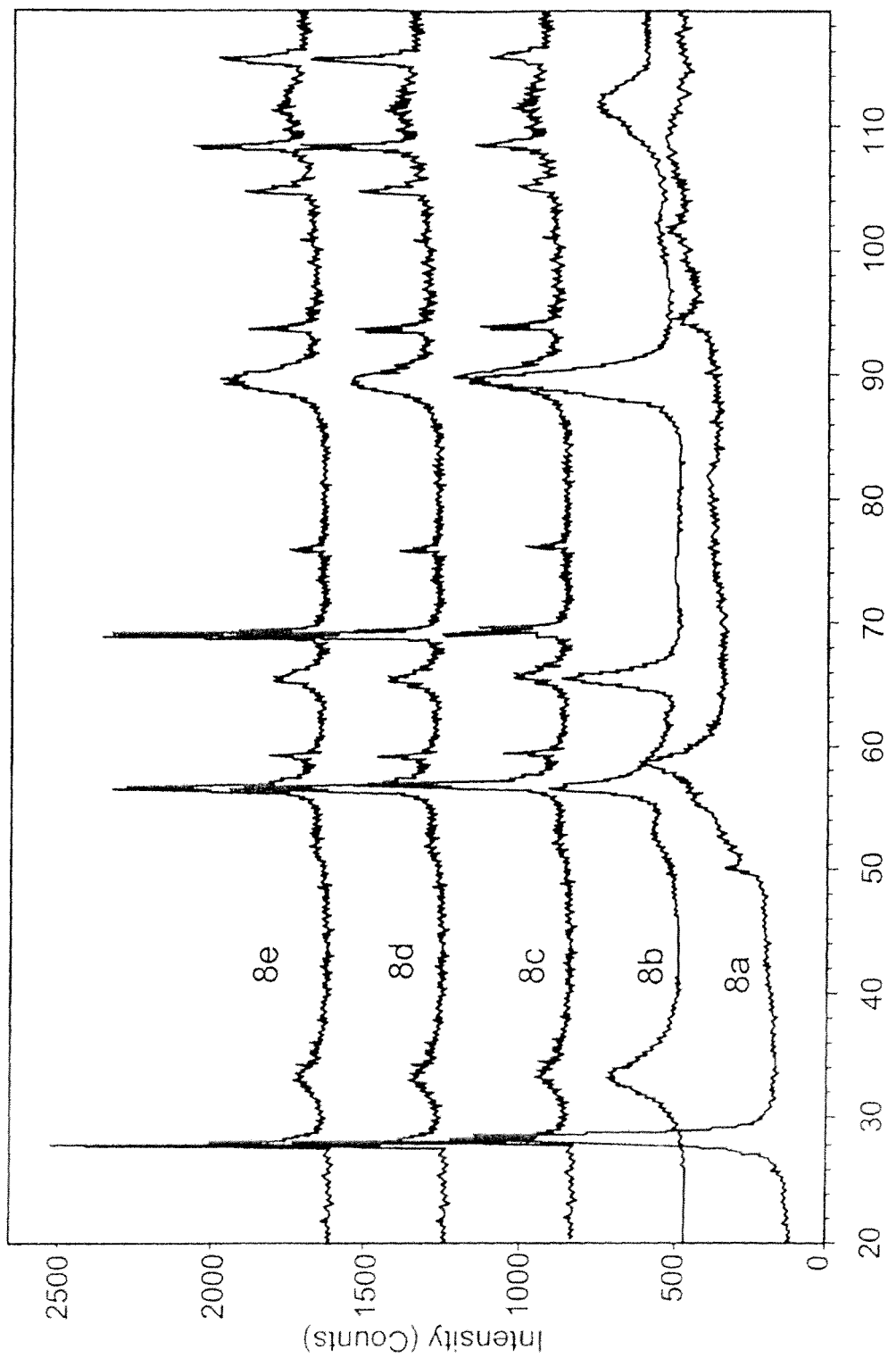
FIG. 15 shows powder X-ray diffraction (Cu $K_f$ radiation) patterns for embodiments of cathode active materials.

Referring to FIG. 15, the powder XRD patterns are depicted for Examples 8a-8e. Analysis of the powder XRD patterns confirmed that the composites including the delithiated LiNiO$_2$ of Example 8d-1 and acid-treated EMD are different from those of EMD and β-NiOOH as well as those of the blends of EMD and β-NiOOH. The XRD patterns also confirmed that the one-step acid treatment of a blend of LiNiO$_2$ and EMD produced a composite that is similar in structure to a blend of delithiated. LiNiO$_2$ and acid-treated EMD.

Figure 16:
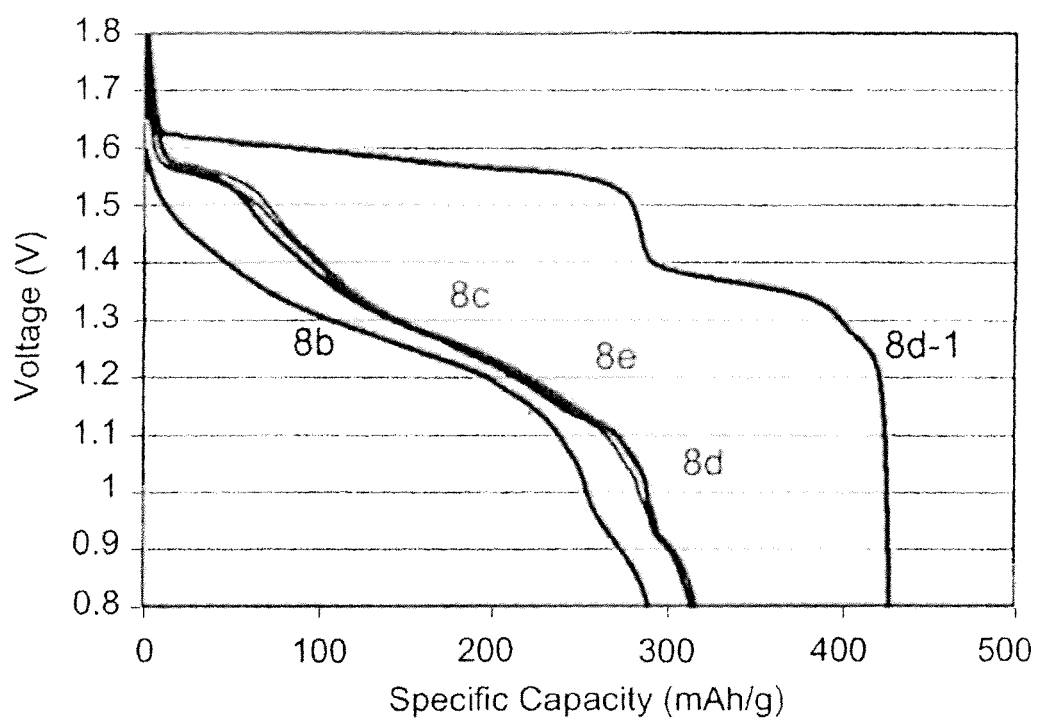
FIG. 16 is a graph showing discharge performance of batteries with cathodes including composites including embodiments of cathode active materials.

The discharge performance of the various blends and composites including the delithiated LiNiO$_2$ and either acid-treated EMD or EMD was evaluated in alkaline button cells by the general method of Example 2. The characteristic physical properties including the true density, specific surface area, and average particle size of Examples 8b, 8c, and 8d-1 are given in Table 9. Referring to FIG. 16, discharge curves for cells with cathodes including commercial EMD (Example 8b); the delithiated LiNiO$_2$ (Example 8d-1); a composite including 13% by weight delithiated LiNiO$_2$ and 87% by weight acid-treated EMD (Example 8c) prepared from a blend including 25% by weight precursor LiNiO$_2$ and 75% by weight EMD a blend including 25% by weight delithiated LiNiO$_2$, and 75% by weight acid-treated EMD (Example 8e); and a blend including 25% by weight delithiated LiNiO$_2$ and 75% by weight EMD (Example 8d) are depicted. Referring to FIG. 16, the cells with cathodes including only the delithiated LiNiO$_2$ (Example 8d-1) have the highest average discharge voltage and specific capacity while the cells including only EMD (Example 8b) have the lowest, voltage and specific capacity. Also referring to FIG. 16, the cells with cathodes including the composite containing 13% by weight delithiated LiNiO$_2$ and 87% by weight acid-treated EMD (Example 8c) provided comparable average discharge voltage and specific capacity compared to the cells with cathodes including blends containing 25% by weight delithiated LiNiO$_2$ and 75% by weight EMD (Example 8d) or 25% by weight delithiated LiNiO$_2$ and 75% by weight acid-treated EMD (Example 8e). Cells with cathodes including the composite (Example 8c) also provide greater than 110% of the specific capacity of cells with cathodes including only EMD) (Example 8b).

mid-rate tests, for example, toy and CD test compared to batteries of a similar design including commercial EMD. Specific test conditions employed are described in Table 10. Referring to Table 10, batteries including the composite of Example 8c showed improved high-rate performance (e.g., digital camera test) while maintaining similar mid-rate performance compared to the batteries including the commercial EMD. For example, the digital camera test performance of the batteries including the composite of Example 8c exceeded that of the batteries including EMD by more than 70 percent. Alkaline batteries with cathodes including a composite of delithiated LiNiO$_2$ and acid-treated EMD have demonstrated superior performance as general purpose batteries.

TABLE 10

Test performance comparison of AA prototype batteries.

| Test description | Example 8c (composite) | Example 8b (EMD) |
|---|---|---|
| CD test: 0.25 A for 1 hr/day, to 0.9 V cutoff (service hours) | 8.6 | 8.4 |
| Toy Test: 3.9 ohm for 1 hr/day, to 0.8 V cutoff (service hours) | 7.6 | 7.2 |
| Digital camera test (ANSI): 1500 mW for 2 sec, 650 mW for 28 sec, repeated for 5 min/hr, to 1.05 V cutoff (number of pictures) | 196 | 114 |

Example 10

An indirect method for estimating the approximate average oxidation state of Co and Ni in delithiated metal oxides includes determining the specific capacities by discharging coin cells with cathodes including the delithiated metal oxide and Li metal anodes with a non-aqueous electrolyte, for example, 1M LiPF$_6$ dissolved in equal volumes of

TABLE 9

Physical properties and discharge performance of a delithiated LiNiO$_2$ and a composite of the delithiated LiNiO$_2$ and acid-treated EMD.

| Properties | Delithiated LiNiO$_2$ (Example 8d-1) | Composite of 87 wt % EMD + 13 wt % delithiated LiNiO$_2$ (Example 8c) | Commercial EMD (Example 8b) |
|---|---|---|---|
| True density (g/cc) | 4.80 | >4.48 | 4.45 |
| BET SSA (m$^2$/g) | 19 | 43 | 30 |
| Ave. particle size, D$_{50}$ (μm) | 5 | — | 45 |
| Specific capacity to 0.8 V@ 10 mA/g (mAh/g) | 425 | 315 | 285 |
| OCV, button cells (V) | 1.95 | 1.73 | 1.63 |
| Average voltage, button cells (V) | 1.45 | >1.25 | ~1.20 |

Example 9

Figure 17:
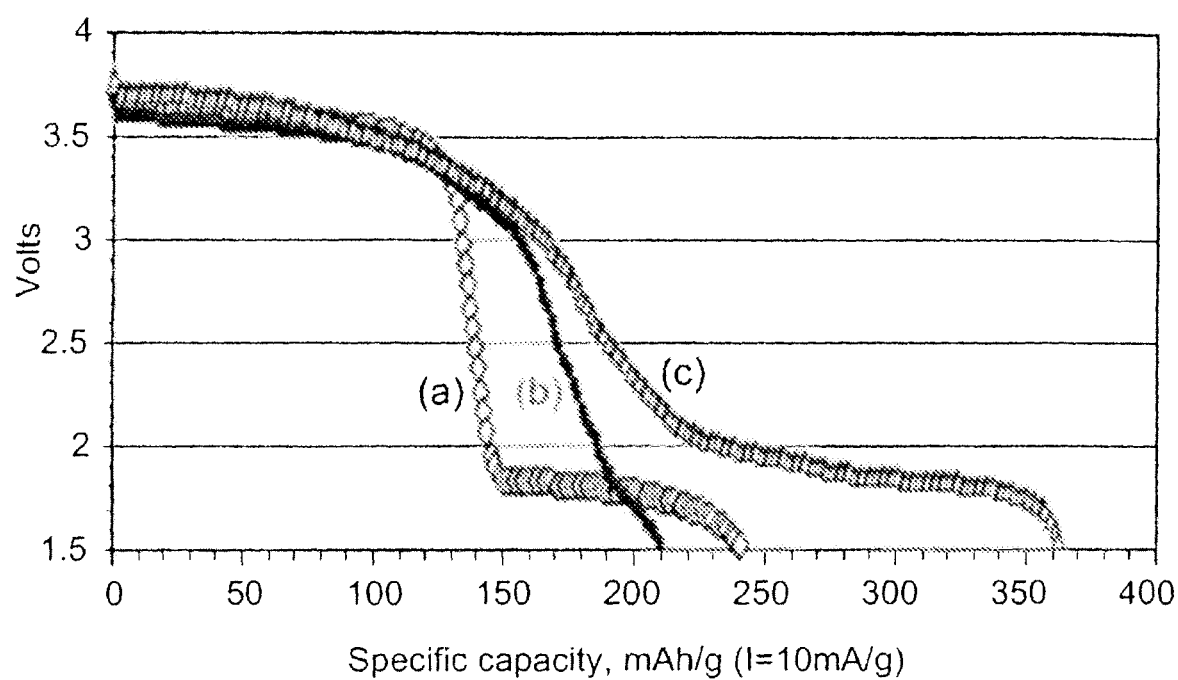
FIG. 17 is a graph showing discharge performance for non-aqueous batteries with cathodes including embodiments of cathode active materials and anodes including lithium metal.

The discharge performance of prototype AA batteries with a cathodes including the composite of Example 8c were evaluated and compared to that of comparable AA batteries including commercial EMD. The batteries were evaluated for performance in a high-rate digital camera test and ethylene carbonate (EC) and dimethyl carbonate (DMC). Referring to FIG. 17, discharge curves for lithium coin cells with cathodes including (a) Li$_{1-x}$H$_y$NiO$_2$ (DLNO-1c); (b) Li$_{1-x}$H$_y$(Ni$_{0.8}$Co$_{0.2}$)O$_2$ (DLNCO-80); and (c) Li$_{1-x}$H$_y$(Ni$_{0.8}$Co$_{0.15}$Al$_{0.015}$)O$_2$ (DLNCAO-80) discharged at a relative low rate (e.g., 10 mA/g) are depicted. The capacity to a 1.8V cutoff voltage approximately corresponds to an average oxidation state for the metal ions in the above compositions with values of approximately +3.6, +3.7, and +3.8, respectively. Therefore, for the above delithiated nickel oxides, the average oxidation state of the transition metal, for example, nickel or nickel and cobalt was estimated to be in the range of +3.6 to +3.8.

All references, such as patent applications, publications, and patents, referred to herein are incorporated by reference in their entirety.

Other embodiments are in the claims.

What is claimed is:

1. A method of making a primary alkaline battery comprising:
   preparing a cathode material by a process comprising treating $LiNiO_2$ with acid;
   incorporating the cathode material and a further cathode material selected from the group consisting of electrolytic manganese dioxide, chemically-prepared manganese dioxide, acid-treated electrolytic manganese dioxide, acid-treated chemically-prepared manganese dioxide, and combinations thereof into a cathode;
   incorporating the cathode into the battery;
   incorporating an anode into the battery; and
   incorporating an aqueous alkaline electrolyte into the battery.

2. The method of claim 1, wherein the anode includes zinc or a zinc alloy.

3. The method of claim 1, wherein the battery includes a separator between the cathode and the anode.

4. The method of claim 1, wherein the acid is aqueous sulfuric acid.

5. The method of claim 1, wherein the acid is aqueous nitric acid.

6. The method of claim 1, wherein the concentration of the acid is between 1 M and 10 M.

7. The method of claim 1, wherein preparing the cathode material further comprises washing with water.

8. The method of claim 1, wherein the cathode comprises $Li_{1-x}H_yNiO_2$, wherein x is greater than 0 and less than 1, and wherein y is less than or equal to x.

9. The method of claim 1, wherein the one or more further cathode materials is electrolytic manganese dioxide.

10. A primary battery comprising:
    a cathode comprising a cathode active material prepared by a process comprising treating $LiNiO_2$ with acid, the cathode further comprising a cathode material selected from the group consisting of electrolytic manganese dioxide, chemically-prepared manganese dioxide, acid-treated electrolytic manganese dioxide, acid-treated chemically-prepared manganese dioxide, and combinations thereof.

11. The battery of claim 10, further comprising an anode, a separator, and an alkaline electrolyte.

12. The battery of claim 11, wherein the anode includes zinc or a zinc alloy.

13. The battery of claim 11, wherein the alkaline electrolyte comprises an aqueous alkali metal hydroxide solution.

14. The battery of claim 10, wherein the cathode comprises $Li_{1-x}H_yNiO_2$, wherein x is greater than 0 and less than 1, and wherein y is less than or equal to x.

15. The battery of claim 10, wherein the one or more further cathode materials is electrolytic manganese dioxide.

* * * * *